(12) United States Patent
Iwasaka et al.

(10) Patent No.: US 7,200,478 B2
(45) Date of Patent: Apr. 3, 2007

(54) LANE DEPARTURE PREVENTION APPARATUS

(75) Inventors: Takeshi Iwasaka, Zama (JP);
Masahiro Ozaki, Yokohama (JP);
Yoshitaka Uemura, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 411 days.

(21) Appl. No.: 10/960,703

(22) Filed: Oct. 8, 2004

(65) Prior Publication Data

US 2005/0096826 A1    May 5, 2005

(30) Foreign Application Priority Data

Oct. 31, 2003  (JP)  ............................. 2003-372852
Dec. 17, 2003  (JP)  ............................. 2003-419053

(51) Int. Cl.
*G06F 19/00* (2006.01)

(52) U.S. Cl. ..................... 701/70; 701/301; 348/148

(58) Field of Classification Search .................. 701/36, 701/41, 70, 300, 301; 348/148; 340/435, 340/436, 903
See application file for complete search history.

(56) References Cited

U.S. PATENT DOCUMENTS 6,879,890 B2 * 4/2005 Matsumoto et al. .......... 701/23
7,107,137 B2 * 9/2006 Tange et al. ................... 701/70
2004/0215393 A1 * 10/2004 Matsumoto et al. ......... 701/300
2005/0096828 A1 * 5/2005 Uemura et al. ............... 701/70
2005/0107939 A1 * 5/2005 Sadano et al. ................ 701/70
2005/0125153 A1 * 6/2005 Matsumoto et al. ......... 701/300
2006/0142922 A1 * 6/2006 Ozaki et al. ................... 701/70
2006/0149448 A1 * 7/2006 Tange et al. ................... 701/41

FOREIGN PATENT DOCUMENTS

| EP | 1 298 021 A1 | 8/2002 |
| JP | 2000-033860 A | 2/2000 |
| JP | 2003-112540 A | 4/2003 |

* cited by examiner

*Primary Examiner*—Gary Chin
(74) *Attorney, Agent, or Firm*—Global IP Counselors

(57) ABSTRACT

A lane departure prevention apparatus is configured to conduct a course correction in a lane departure avoidance direction when the controller determines that there is a potential for a vehicle to depart from a driving lane. The controller combines yaw control and deceleration control to conduct departure prevention control in accordance with the lane departure condition and the running condition. Preferably, a target yaw moment in a lane departure avoidance direction is calculated which takes in consideration the running condition of the vehicle such as disturbances changing the vehicle behavior and the road surface friction coefficient of the driving lane, and a deceleration amount of a necessary minimum for suppressing a feeling of discomfort in the passengers stemming from the yaw moment provided to the vehicle is calculated based on the basis of the running condition of the vehicle.

20 Claims, 11 Drawing Sheets

LANE DEPARTURE PREVENTION APPARATUS

BACKGROUND OF THE INVENTION

1. Field of the Invention

The present invention generally relates to a lane departure prevention apparatus for preventing a host vehicle from departing from a driving lane when the host vehicle is about to depart from the lane or departure seems imminent.

2. Background Information

Conventional lane departure prevention apparatuses include apparatuses for imparting yaw moment to the host vehicle by controlling the braking force to the wheel and preventing the host vehicle from deviating from the driving lane. These conventional lane departure prevention apparatuses also inform the driver that the host vehicle may possibly depart from the driving lane by providing this yaw moment in cases in which there is a possibility that the host vehicle may depart from a driving lane. For example, one such lane departure prevention apparatus is disclosed in Japanese Laid-Open Patent Publication No. 2000-33860, which controls the brakes to provide a yaw moment to the host vehicle and prevents lane departure, and which also warns the driver through this yaw moment (see, page 3 and FIG. 6). This conventional lane departure prevention apparatus determines a lane departure by whether or not any of the distance from a driving lane center of a host vehicle driving position (lateral shift amount) and the angle that an estimated driving course forms with respect to the driving lane (yaw angle shift amount) has exceeded respective predetermined values.

Another lane departure prevention apparatus is disclosed in Japanese Laid-Open Patent Publication No. 2003-112540 (p. 7 and FIG. 2), which evaluates the lane departure of the host vehicle from its driving lane, and avoids lane departure by combining yaw control and deceleration control. In particular, the yaw control applies the brakes to provide a yaw moment to the host vehicle in which a braking force difference is applied to the left and right wheels to avoid lane departure, while the deceleration control applies the brakes to decelerate the host vehicle. The total braking force of the yaw control and the deceleration control is applied according to the amount by which the vehicle is estimated to depart from its lane in the future, which is calculated on the basis of the driving state of the host vehicle.

In view of the above, it will be apparent to those skilled in the art from this disclosure that there exists a need for an improved lane departure prevention apparatus. This invention addresses this need in the art as well as other needs, which will become apparent to those skilled in the art from this disclosure.

SUMMARY OF THE INVENTION

However, it has been discovered that in the conventional lane departure prevention apparatus, disclosed in Japanese Laid-Open Patent Publication No. 2000-33860, because lane departure is determined from the peripheral environment and the running condition, there is the unsolved problem that the lane departure prevention apparatus cannot suitably accommodate lane departure stemming from changes in the host vehicle behavior resulting from disturbances on the driving lane such as unevenness and the friction coefficient of the driving lane.

Moreover, it has been discovered that in the conventional lane departure prevention apparatus, disclosed in Japanese Laid-Open Patent Publication No. 2003-112540, that when departure from the driving lane is determined, the brake hydraulic pressure is calculated in accordance with the lane departure estimation amount from the future lane, and the yaw moment is provided to the host vehicle. Thus, there is the unsolved problem that there is the potential for the host vehicle behavior at the time the yaw moment is generated to give a feeling of discomfort to passengers including the driver when the friction coefficient between the driving road surface and the tires is low.

Thus, the present invention was conceived in light of these unsolved problems in the above-described conventional examples. One object of the present invention is provide a lane departure prevention apparatus that can improve lane departure prevention performance even in consideration of changes in the host vehicle behavior resulting from disturbances on the driving lane. Another object of the present invention is provide a lane departure prevention apparatus that can conduct departure avoidance control which minimizes the discomfort feeling of the passengers from the yaw moment being applied to the vehicle, even when the road surface friction coefficient is low.

In order to solve some of the above-described problems, a lane departure prevention apparatus of the present invention is provided with a running condition detecting section, a yaw control amount calculating section, a braking control amount calculating section and a braking force control section.

The running condition detecting section is configured to detect a running condition of a host vehicle. The yaw control amount calculating section is configured to calculate a first braking force control amount based on the running condition detected by the running condition detecting section such that a yaw moment is generated in a direction avoiding lane departure of the host vehicle from a driving lane. The braking control amount calculating section is configured to calculate a second braking force control amount based on the running condition detected by the running condition detecting section such that the host vehicle decelerates. The braking force control section is configured to control a total braking force control amount in accordance with the first and second braking force control amounts calculated by the yaw control amount calculating section and the braking control amount calculating section.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
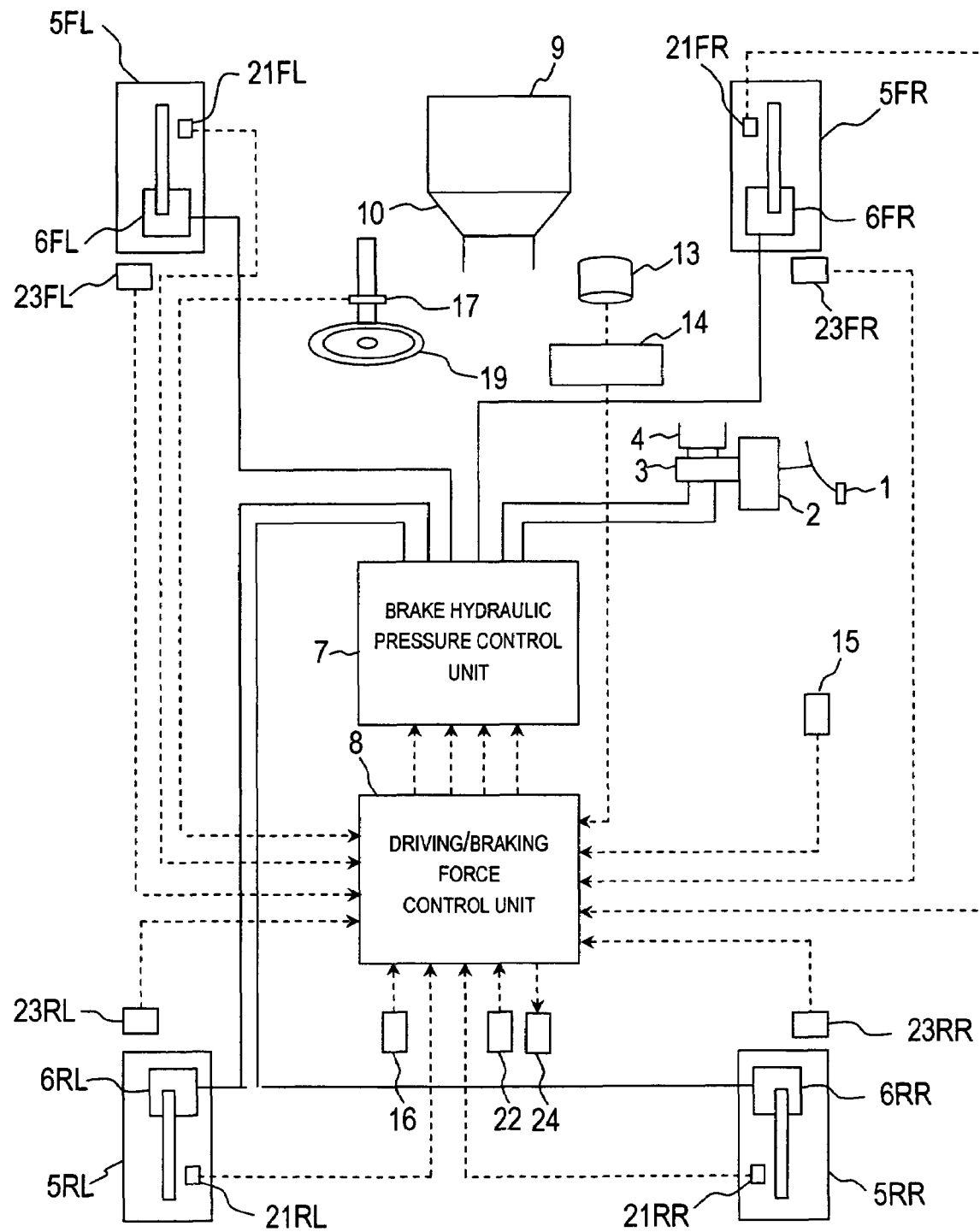
FIG. 1 is a schematic structural diagram of a vehicle equipped with a lane departure prevention apparatus in accordance with a first embodiment of the present invention.

Referring initially to FIG. 1, a schematic structural diagram of a host vehicle is illustrated that is equipped with a lane departure prevention apparatus in accordance with a first embodiment of the present invention. The embodiment is a rear wheel drive vehicle equipped with the lane departure prevention apparatus of the present invention. This rear-wheel-drive vehicle is equipped with an automatic transmission and a conventional differential gear, and with a braking system that allows independent control of braking force at the front and rear wheels and the left and right wheels.

In the diagram of FIG. 1, the host vehicle is basically equipped with a brake pedal 1, a booster 2, a master cylinder 3, a reservoir 4, a pair of front wheels 5FL and 5FR, a pair of rear wheels 5RL and 5RR, a pair of front wheel cylinders 6FL and 6FR, a pair of rear wheel cylinders 6RL and 6RR, a brake hydraulic pressure control unit 7, a controller or driving/braking force control unit 8, an engine 9, an automatic transmission 10, an imaging unit or camera 13, a camera controller 14, a navigation system 15, a master cylinder pressure sensor 16, a steering angle sensor 17, a steering wheel 19, a pair of front wheel velocity sensors 21FL to 21FR and a pair of rear wheel velocity sensors 21RL to 21RR, a direction indication (turn signal) switch 22, a pair of rear suspension stroke sensors 23RL and 23RR, a pair of front suspension stroke sensors 23FL and 23FR, and an alarm or warning device 24.

The wheel cylinders 6FL to 6RR, the brake hydraulic pressure control unit 7, the controller 8 all form part of a braking apparatus that allows independent control of braking force for the front and rear wheels and the left and right wheels. The brake hydraulic pressure is boosted by the master cylinder 3 such that the brake fluid is ordinarily fed to the wheel cylinders 6FL to 6RR of the wheels 5FL to 5RR in accordance with the downward force (depression amount) exerted by the driver on the brake pedal 1. Also, the brake hydraulic pressure control unit 7 is interposed between the master cylinder 3 and the wheel cylinders 6FL to 6RR for allowing the brake hydraulic pressure of the wheel cylinders 6FL to 6RR to be individually controlled by the brake hydraulic pressure control unit 7.

The brake hydraulic pressure control unit 7 is preferably configured and arranged, for example, to carry out anti-skid control and traction control. The brake hydraulic pressure control unit 7 is also configured and arranged to independently control the braking hydraulic pressure of the wheel cylinders 6FL to 6RR. Thus, the brake hydraulic pressure control unit 7 is also configured so as to control the brake hydraulic pressure in accordance with a brake hydraulic pressure command value when the brake hydraulic pressure command value is input from the controller 8. In other words, the controller 8 functions as a controller for an anti-skid control (ABS) and/or vehicle dynamics behavior control (VDC). The controller 8 is configured to estimate the friction coefficient ii between the driving road surface and the tires, and to store the estimated road surface friction coefficient μ in the storage device.

The controller 8 preferably includes a microcomputer with a lane departure prevention control program that controls the wheel cylinders 6FL, 6FR, 6RL and 6RR to apply a yaw moment to the host vehicle as discussed below. The controller 8 can also include other conventional components such as an input interface circuit, an output interface circuit, and storage devices such as a ROM (Read Only Memory) device and a RAM (Random Access Memory) device. The memory circuit stores processing results and control programs such as ones for controlling the braking control operations that are run by the processor circuit. The controller 8 is operatively coupled to the above mentioned sensors in a conventional manner. The internal RAM of the controller 8 stores statuses of operational flags and various control data. The internal ROM of the controller 8 stores the programs and predetermined variables for various operations. The controller 8 is capable of selectively controlling any number of the components of the host vehicle as needed and/or desired. It will be apparent to those skilled in the art from this disclosure that the precise structure and algorithms for the controller 8 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The controller 8 of the present invention is configured to conduct a lane departure determination on the basis of the running condition of the host vehicle such as changes in the host vehicle behavior resulting from disturbances on the host vehicle driving lane and/or the road surface friction coefficient of the host vehicle driving road. The controller 8 of the first embodiment of present invention is configured to determine that the host vehicle is in a tendency to depart from the driving lane in accordance with changes in the host vehicle behavior resulting from disturbances on the host vehicle driving lane. Thus, even when the host vehicle behavior changes due to disturbances such as unevenness on a road and a low friction coefficient road and the host vehicle is in a tendency to depart from the host vehicle driving lane, lane departure can be appropriately avoided and lane departure prevention control can be conducted without the driver feeling discomfort.

The imaging unit or camera 13 operatively connected to the camera controller 14, which has a picture processing function. The camera 13 and the camera controller 14 are configured and arranged on the host vehicle so as to function as an external field recognition sensor for detecting the position of the host vehicle in a driving lane for driving lane departure prevention determination of the host vehicle. In other words, the CCD camera 13 and the camera controller 14 are designed to detect the position of the host vehicle in the driving lane in order to detect the lane departure tendency of the host vehicle. The camera 13 can be a monocular (single-lens) camera composed of a CCD (Charge Coupled Device) camera, for example. The camera 13 is preferably disposed on the front of the host vehicle.

Preferably, the camera controller 14 is configured to be able to detect, from the imaging picture of the area in front of the vehicle taken by the camera 13, lane markers such as road demarcation lines to detect the driving lane. In other words, the camera controller 14 is preferably configured and arranged to detect white lines or other lane markers, for example, from the imaging picture of the area in front of the host vehicle. Thus, the driving lane is detected based on the detected lane markers. The camera controller 14 is also configured to calculate a yaw angle $\Phi$ of the host vehicle with respect to the driving lane (i.e., yaw angle $\Phi$ formed by the driving lane of the host vehicle and the longitudinal axis of the host vehicle), a lateral displacement X from the driving lane center, a driving lane curvature $\rho$, and a lane width L. These calculation signals and the like are outputted to the controller 8.

The navigation device 15 is preferably configured and arranged to detect the yaw rate $\phi$ and the longitudinal acceleration Yg and/or the lateral acceleration Xg generated in the host vehicle. The navigation device 15 outputs the detected longitudinal acceleration Yg, the detected lateral acceleration Xg, and the detected yaw rate $\phi$ to the controller 8. The navigation device 15 also outputs road information to the controller 8.

The master cylinder pressure sensor 16 is preferably configured and arranged to detect the output pressure of the master cylinder 3, that is, the master cylinder hydraulic pressure Pm. Thus, the master cylinder pressure sensor 16 serves as a brake operation deceleration amount detecting section that detects the output pressure (the so-called master cylinder pressure Pm) of the master cylinder 3. This detection signal is outputted to the controller 8.

The steering angle sensor 17 is preferably configured and arranged to detect the steering angle $\delta$ of the steering wheel 19. This detection signal is outputted to the controller 8.

The wheel velocity sensors 21FL to 21RR are preferably configured and arranged to detect the rotational velocity of the wheels 5FL to 5RR, that is, the so-called wheel velocity Vwi (i=FL, FR, RL, RR). These detection signals are outputted to the controller 8

The direction indication (turn signal) switch 22 preferably configured and arranged to detect a direction indication (turn signal) operation resulting from a direction indicator (turn signal indicator). This detection signal is outputted to the controller 8.

The suspension stroke sensors 23FL to 23RR that detect the vertical wheel stroke amount $St_j$ (j=FL, FR, RL, RR) of the wheels 5FL to 5RR. These detection signals are outputted to the controller 8.

When there is left or right directionality in the detected driving (running) condition data of the host vehicle, the two directions are set such that the left direction is the positive direction. Namely, the yaw rate $\phi$, the lateral acceleration Xg, and the yaw angle $\Phi$ are positive values when turning left, and the lateral displacement X is a positive value when shifting leftward from the center of the driving lane to the left.

Also, disposed in front of the driver seat is the warning device 24 that issues a warning to the driver in accordance with an alarm signal AL from the controller 8 when driving lane departure is detected. A speaker for generating a voice or buzzer sound is internally disposed in the warning device 24.

Next, lane departure prevention control processing conducted by the controller 8 will be described in accordance with the flowchart of FIG. 2. The lane departure prevention control processing is executed by timer interruption processing at a specific predetermined sampling time interval $\Delta T$ such as every 10 msec, for example. Communication processing is not included in the processing shown in FIG. 2, but the information obtained by computational processing is updated and stored in random access memory, and required information is read out from the random access memory when required.

First, in step S1, various data from the sensors and controller are read by the controller 8. Specifically, each wheel velocity Vwi detected by the sensors, the master cylinder pressures Pm, the steering angle $\delta$, the direction indication (turn signal) switch signal WS, the stroke amount $St_j$, the lateral acceleration Xg, the longitudinal acceleration Yg, the yaw rate $\phi$, the vehicle yaw angle $\Phi$ with respect to the driving lane from the camera controller 14, the lateral displacement X from the driving lane center, and the driving lane curvature ρ are all read by the controller 8.

Next, the processing moves to step S2 where, the host vehicle velocity V is calculated based on the average value of the wheel velocities of the non-driven wheels. In the illustrated embodiment, the host vehicle is driven by the rear wheels, so the host vehicle velocity V is calculated based on the velocities $Vw_{FL}$ and $Vw_{FR}$ of the front left and right wheels 5FL and 5FR. Thus, in the illustrated embodiment, the host vehicle velocity V is calculated using Equation (1), as shown below, from the average value of the velocities $Vw_{FL}$ and $Vw_{FR}$ of the front left and right wheels, which are the non-driven wheels.

$$V = (Vw_{FL} + Vw_{FR})/2 \qquad (1)$$

Next, in step S3, affects resulting from disturbances on the host vehicle driving lane are determined. When affects resulting from disturbances on the host vehicle driving lane are received, a yaw moment resulting from a reduction in the grip of a certain wheel is generated and a change in the traveling direction arises. Here, examples of disturbances on the driving lane include unevenness on the road surface (unpaved portions, etc.) and low friction coefficient roads (a wet road surface, manholes in rainy weather, fallen leaves on the road surface, piles of pebbles, etc.).

Thus, the presence/absence of disturbance affects resulting from unevenness on the road surface is determined on the basis of the stroke amount $St_j$, and the presence/absence of disturbance affects resulting from a low μ road is determined on the basis of the slip ratio $Sd_j$. When the controller 8 determines that these disturbance affects on the driving lane are received, the controller 8 determines that the host vehicle will continue to receive the disturbance affects for a predetermined time thereafter.

Next, in step S4, the estimated time of lane departure $T_{out}$ until the host vehicle departs is calculated based on Equation (2) below on the basis of the lateral displacement X, the variation amount dX of the lateral displacement, and the distance to the lane (L/2−X), and then the processing moves to step S5.

$$T_{out} = (L/2 - X)/dX \qquad (2)$$

The estimated time of departure $T_{out}$ may also be estimated by the yaw angle Φ of the host vehicle, the driving lane curvature ρ, the yaw rate φ of the vehicle, and the steering angle δ.

In step S5, the controller 8 determines whether or not the estimated time of lane departure $T_{out}$ calculated in step S4 is smaller than a lane departure determination threshold Ts. When $T_{out} \geq Ts$ occurs, the controller 8 determines that the host vehicle is not in a lane departure tendency, the processing moves to step S6, where the lane departure determination flag $F_{out}$ is reset to "0" meaning the host vehicle is not in a lane departure tendency, and the processing moves to a later-described step S11.

When the determination result of step S5 is $T_{out} < Ts$, the controller 8 determines that the host vehicle is in a lane departure tendency, the processing moves to step S7, where the lane departure determination flag $F_{out}$ is set to "1" meaning the host vehicle is in a lane departure tendency, and the processing moves to step S8.

In step S8, the direction (negative or positive value) of the lateral displacement X is determined. When $X \geq 0$, the controller 8 determines that the host vehicle is displaced leftward from the driving lane center, the processing moves to step S9, the lane departure direction $D_{out}$ is set to "1" meaning the lane departure direction is to the left side, and the processing moves to the later-described step S11.

When the determination result of step S8 is X<0, the processing moves to step S10, where the lane departure direction $D_{out}$ is set to "2" meaning the lane departure direction is to the right side, and the processing moves to step S11.

In step S11, the controller 8 determines whether or not the driver intends to change lanes. This determination is conducted by the direction indication switch signal WS and the steering angle δ. When the lane departure direction $D_{out}$ and the direction determined by the value of the direction indication switch signal WS match when the direction indication switch 22 is ON, the controller 8 determines that it is the driver's intent to change lanes.

When the steering angle δ is equal to or greater than a preset steering angle set value δs, and the steering angle variation amount Δδ is equal to or greater than a preset variation set value Δδs, and the steering direction and the lane departure direction match each other when the direction indication switch is OFF, the controller 8 determines that it is the driver's intent to change lanes.

Here, a case is described where whether or not it is the driver's intent to change lanes is determined by the steering angle and the steering angle variation amount, but the intent to change lanes can also be determined on the basis of the steering torque.

Then, in step S11, when the controller 8 determines that it is not the driver's intent to change lanes, the processing moves to step S12, where the lane change flag $F_{ch}$ is reset to "0" meaning that it is not the intent of the driver to change lanes, and the processing moves to step S13, where the controller 8 determines whether or not the lane departure determination flag $F_{out}$ is set to "1". When $F_{out}=0$, the processing moves to a later-described step S18, and when $F_{out}=1$, the processing moves to step S14, where an alarm is activated by outputting the alarm signal AL to the alarm device 24.

Next, in step S15, the target yaw moment is calculated by Equation (3) below, and the processing moves to a later-described step S21.

$$Ms = K_1 \cdot X + K_2 \cdot dX \qquad (3)$$

Here, the terms $K_1$ and $K_2$ are gains that vary or fluctuate in accordance with the vehicle velocity V.

When the controller 8 determines in step S11 that it is the driver's intent to change lanes, the processing moves to step S16, where the lane change flag $F_{ch}$ is set to "1" representing the fact that it is the driver's intent to change lanes. Next, the processing moves to step S17 where, in the driving lane condition determination processing of step S3, the controller 8 determines whether or not the uneven road flag $Fr_j$ or low μ flag $Fm_j$ is set to "1" meaning that affects resulting from disturbances on the driving lane are being received.

When the determination result of step S17 is $Fr_j \neq 1$ and $Fm_j \neq 1$, the processing moves to step S18, where the lane departure determination flag $F_{out}$ is reset to "0", and the processing moves to step S21. However, when the determination result of step S17 is $Fr_j=1$ or $Fm_j=1$, then the processing moves to step S19, where the controller 8 determines whether or not the driver had intentionally changed lanes before the disturbances on the driving lane were received.

This determination is conducted by whether or not the lane change flag $F_{ch}$ before receiving the affects on the driving lane is set to "1", and when the lane change flag $F_{ch}$ before the disturbance affects is reset to "0", the controller 8 determines that there was no intention to change lanes and the processing moves to step S18.

When the determination result of step S19 is that the lane change flag $F_{ch}$ before the disturbance affects is set to "1", the controller 8 determines that there was an intent to change lanes before the disturbance affects and the processing moves to step S20, where the target yaw moment is calculated by Equation (4) below, and the processing moves to step S21.

$$Ms = K_3(\Phi_2 - \Phi_1) + K_4 \cdot X + K_5 \cdot \rho \qquad (4)$$

Here, the terms $K_3$, $K_4$ and $K_5$ are gains that vary or fluctuate in accordance with the vehicle velocity V, and the terms $\Phi_1$ and $\Phi_2$ are the yaw moments before and after receiving the affects of the disturbances.

In step S21, the target brake hydraulic pressure calculation processing that calculates a target brake hydraulic pressure $Ps_j$ of each wheel is conducted in accordance with the lane departure determination flag $F_{out}$, the target yaw moment Ms and the master cylinder hydraulic pressure Pm.

Next, the processing moves to step S22, where the target brake hydraulic pressures $Ps_{FL}$ to $Ps_{RR}$ calculated in step S21 are outputted to the brake hydraulic pressure control unit 7, the time interruption processing ends and processing returns to a predetermined main program.

Figure 3:
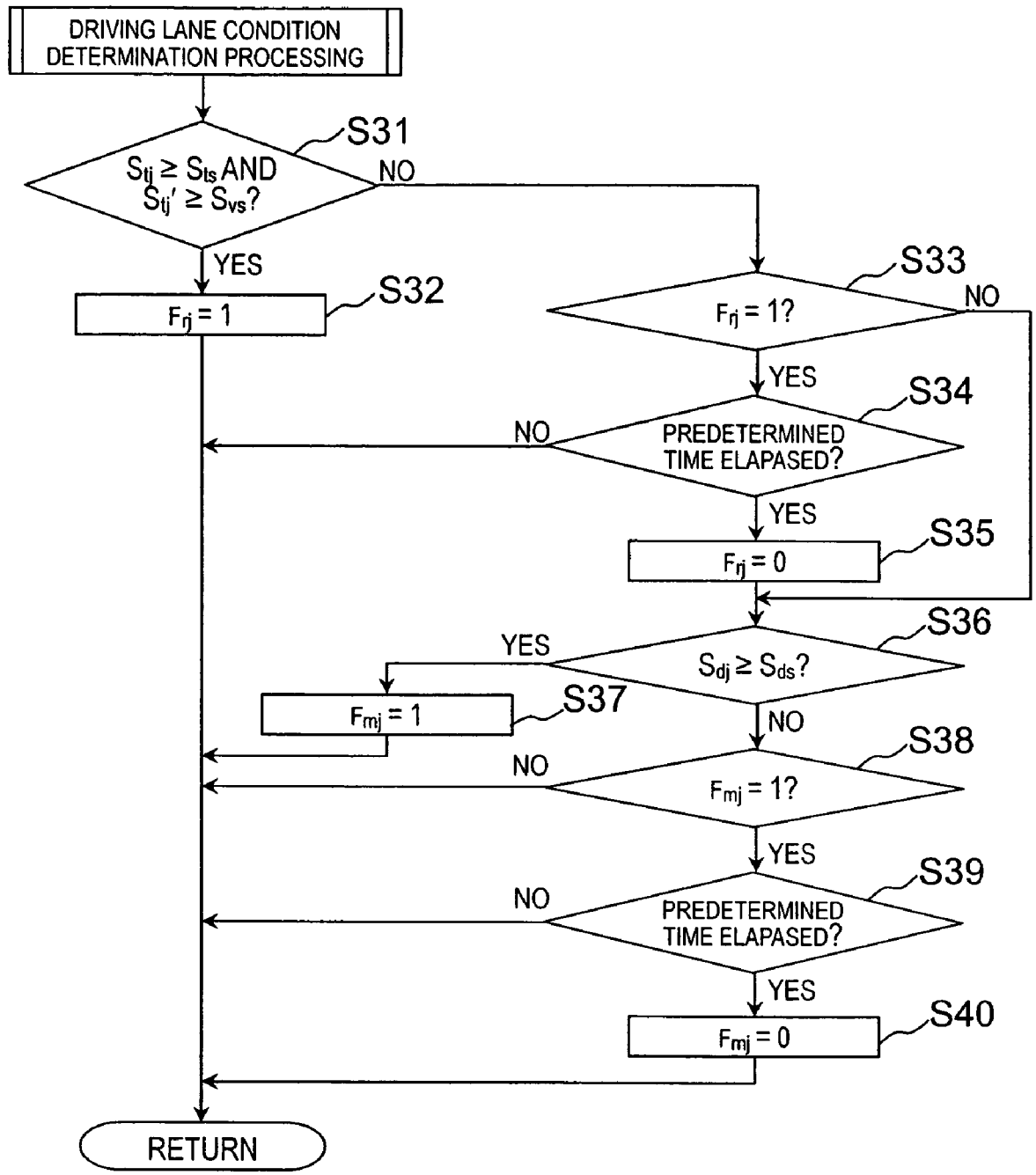
FIG. 3 is a flowchart showing the driving lane condition determination processing executed by the driving/braking force control unit in the lane departure prevention control processing of FIG. 2 in accordance with the first embodiment of the present invention.

Also, in step S3, the driving lane condition determination processing shown in FIG. 3 is conducted. First, in step S31, the controller 8 determines whether or not the host vehicle is receiving affects due to unevenness on the road surface using the stroke amount $St_j$ of each wheel detected by the suspension stroke sensor 23 and the stroke velocity $St_j'$ calculated from the stroke amount $St_j$.

This determination is conducted by whether or not the stroke amount $St_j$ and the stroke velocity $St_j'$ are equal to or greater than preset determination thresholds $St_S$ and $Sv_S$. When $St \geq St_S$ and $St' \geq Sv_S$, the controller 8 determines that the wheels are receiving the affects of unevenness on the road surface, and the processing moves to step S32.

In step S32, the unevenness affect flag $Fr_j$ is set to "1" meaning that disturbance affects are being received, the lane departure determination threshold Ts is set to a value Ts1 smaller than the ordinary departure determination threshold, the brake determination threshold Tr is set to a value Tr1 smaller than the ordinary brake determination threshold, the driving lane condition determination processing ends, and the processing returns to the predetermined main program.

When the determination result of step S31 is $St < St_S$ or $St' < Sv_S$, the processing moves to step S33, where the controller 8 determines whether or not the unevenness affect flag $Fr_j$ is set to "1" in the previous sampling.

Then, when $Fr_j = 0$, the processing moves to a later-described step S36, and when $Fr_j = 1$, the processing moves to step S34, where the controller 8 determines whether or not a predetermined time has elapsed after the affects of unevenness on the road surface are received. When the predetermined time has not elapsed, the driving lane condition determination processing ends with $Fr_j = 1$, and the processing returns to the predetermined main program.

When the predetermined time has elapsed, the processing moves to step S35, where the unevenness affect flag $Fr_j$ is reset to "0", and the processing moves to step 36.

In step S36, the controller 8 determines whether or not the host vehicle is receiving affects due to a low friction coefficient road (low μ road) using the slip ratio $Sd_j$ of each wheel calculated by each wheel velocity and the vehicle velocity.

This determination is conducted by whether or not the slip ratio $Sd_j$ is equal to or greater than the preset determination threshold $Sd_S$. When $Sd_j \geq Sd_S$, the controller 8 determines that the wheels are receiving the affects of a low μ road and the processing moves to step S37.

In step S37, the low μ affect flag $Fm_j$ is set to "1" meaning that disturbance affects are being received, the lane departure determination threshold Ts is set to a value Ts2 smaller than the ordinary departure determination threshold (Ts2 < Ts1), the brake determination threshold Tr is set to a value Tr2 lower than the ordinary brake determination threshold (Tr2 < Tr1), the driving lane condition determination processing ends, and the processing returns to the predetermined main program.

When the determination result of step S36 is $Sd_j < Sd_S$, the processing moves to step S38, where the controller 8 determines whether or not the low μ affect flag $Fm_j$ is set to "1" in the previous sampling.

Then, when $Fm_j = 0$, the driving lane condition determination processing ends with $Fm_j = 0$ and the processing returns to the predetermined main program. When $Fm_j = 1$, the processing moves to step S39, where the controller 8 determines whether or not a predetermined time has elapsed after receiving the affects of a low μ road.

When the determination result of step S39 is that the predetermined time has not elapsed, the driving lane condition determination processing ends with $Fm_j = 1$ and the processing returns to the predetermined main program. When the determination result of step S39 is that the predetermined time has elapsed, the processing moves to step S40, the low μ affect flag $Fm_j$ is reset to "0", the driving lane condition determination processing ends, and the processing returns to the predetermined main program.

Figure 4:
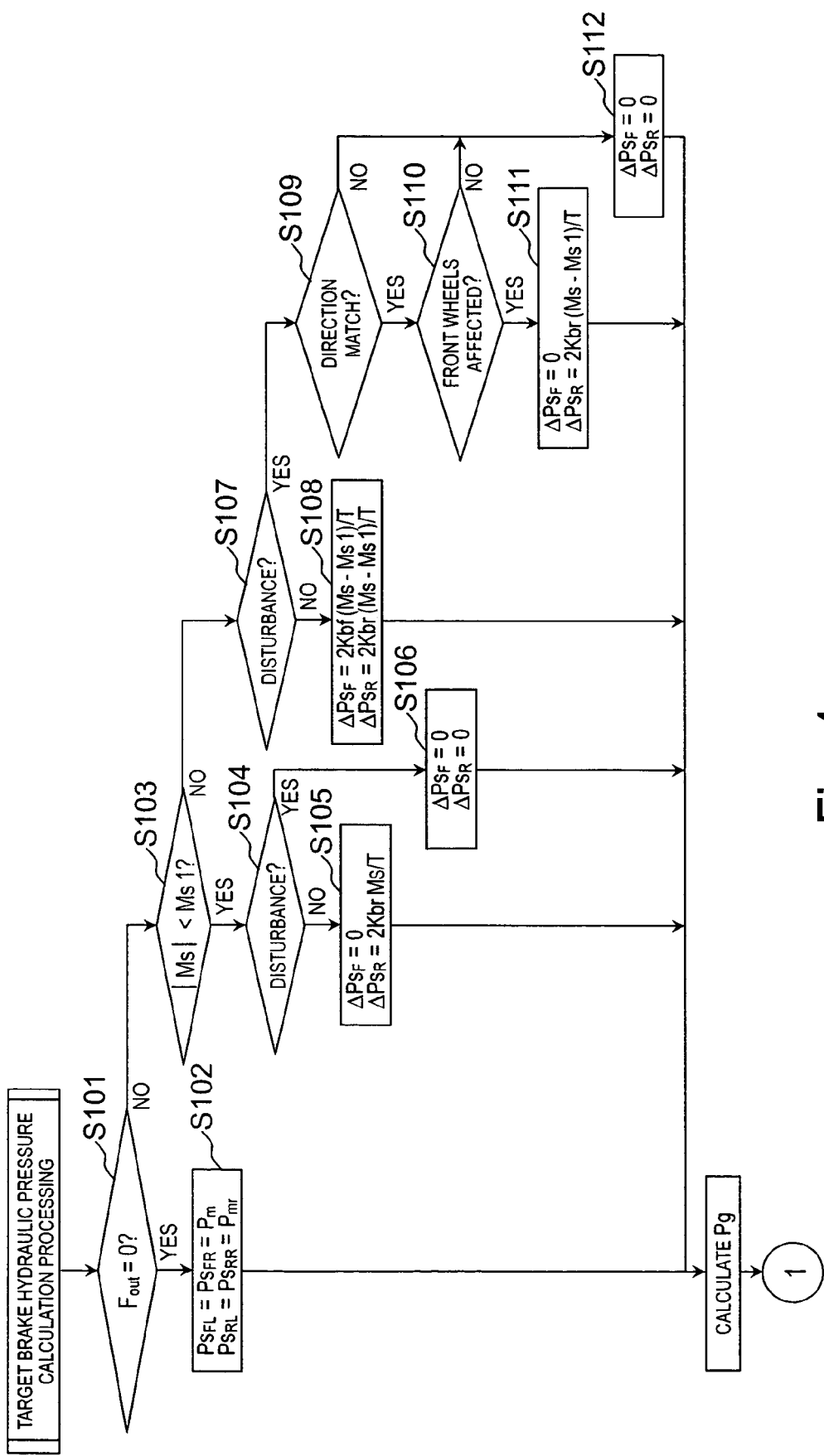
FIG. 4 is a first part of a flowchart showing a target brake hydraulic pressure calculation processing executed by the driving/braking force control unit in the lane departure prevention control processing of FIG. 2 in accordance with the first embodiment of the present invention.
Figure 5:
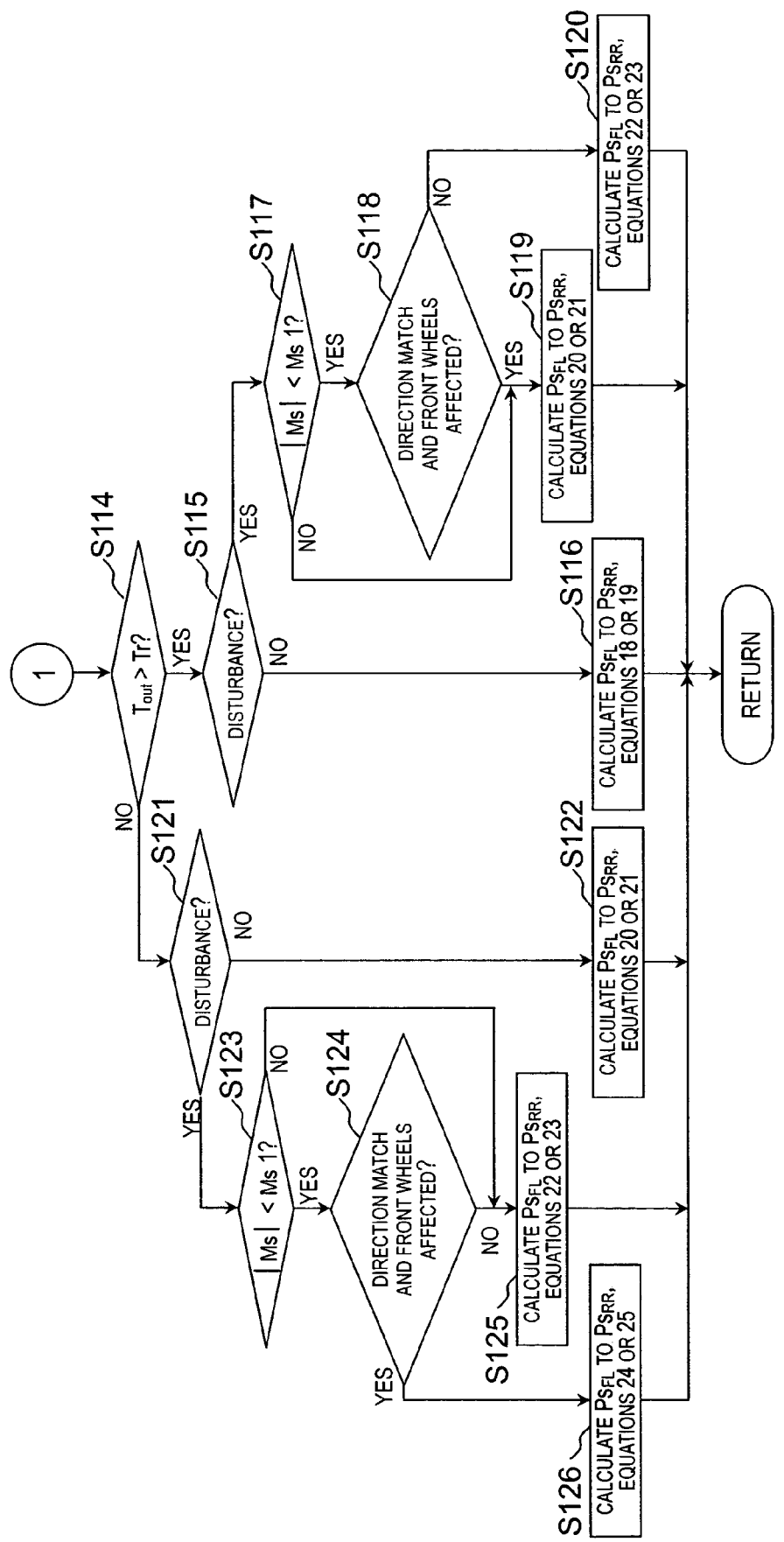
FIG. 5 is a second part of a flowchart showing the target brake hydraulic pressure calculation processing executed by the driving/braking force control unit in the lane departure prevention control processing of FIG. 2 in accordance with the first embodiment of the present invention.

Also, in step S21, the target brake hydraulic pressure calculation processing shown in FIGS. 4 and 5 is conducted. First, in step 101, the controller 8 determines whether or not the lane departure determination flag $F_{out}$ is set to "1".

When the determination result of step S101 is $F_{out} = 0$, the processing moves to step S102 where, as shown in Equation (5) below, the target brake hydraulic pressure $Ps_{FL}$ of the front left wheel and the target brake hydraulic pressure $Ps_{FR}$ of the front right wheel are set to the master cylinder hydraulic pressure Pm, and as shown in Equation (6) below, the target brake hydraulic pressure $Ps_{RL}$ of the rear left wheel and the target brake hydraulic pressure $Ps_{RR}$ of the rear right wheel are set to the rear wheel master cylinder pressure Pmr considering the longitudinal distribution calculated from the master cylinder pressure Pm, the target brake hydraulic pressure calculation processing ends, and the processing returns to the predetermined main program.

$$Ps_{FL} = Ps_{FR} = Pm \qquad (5)$$

$$Ps_{RL} = Ps_{RR} = Pmr \qquad (6)$$

When the determination result of step S101 is $F_{out} = 1$, the processing moves to step S103, where the controller 8 determines whether or not the target yaw moment Ms is equal to or greater than the preset set value Ms1. When |Ms| < Ms1, the processing moves to step S104 where, in the driving lane condition determination processing of step S3, the controller 8 determines whether or not the uneven road flag $Fr_j$ or the low μ flag $Fm_j$ is set to "1" meaning affects resulting from disturbances on the driving lane are being received.

When the determination result of step S104 is that affects resulting from disturbances are not being received, the processing moves to step S105 where, on the basis of Equations (7) and (8) below, the target brake hydraulic pressure differences $\Delta Ps_F$ and $\Delta Ps_R$ are calculated and set so that a difference is generated only in the rear left and right wheels, and the processing moves to a later-described step S113.

$$\Delta Ps_F = 0 \quad (7)$$

$$\Delta Ps_R = 2 \cdot Kbr \cdot |Ms|/T \quad (8)$$

Here, the term T is the same tread of the front and rear wheels. Also, the term $K_{br}$ is a conversion factor when the braking force is converted to the brake hydraulic pressure, and is determined by the brake specification.

Also, when the determination result of step S104 is that affects resulting from disturbances are being received, the processing moves to step S106 where, on the basis of Equations (9) and (10) below, the target brake hydraulic pressure differences $\Delta Ps_F$ and $\Delta Ps_R$ are set to zero and the processing moves to the later-described step S113.

$$\Delta Ps_F = 0 \quad (9)$$

$$\Delta Ps_R = 0 \quad (10)$$

When the determination result of step S103 is $|Ms| \geq Ms_1$, the processing moves to step S107, where the controller 8 determines in the same manner as in step S104 whether or not affects resulting from disturbances on the driving lane are being received. When affects resulting from disturbances are not being received, the processing moves to step S108 where, on the basis of Equations (11) and (12) below, the target brake hydraulic pressure differences $\Delta Ps_F$ and $\Delta Ps_R$ are calculated and set so that a difference is generated in the braking force of each wheel, and the processing moves to the later-described step S113.

$$\Delta Ps_F = 2 \cdot Kbf \cdot (|Ms| - Ms1)/T \quad (11)$$

$$\Delta Ps_R = 2 \cdot Kbr \cdot (|Ms| - Ms1)/T \quad (12)$$

Here, the term Kbf is a conversion factor when the braking force is converted to the brake hydraulic pressure, and is determined by the brake specification. In this case, it can be controlled only with the front wheels and set to $\Delta Ps_F = 2 \cdot Kbf \cdot |Ms|/T$.

Also, when the determination result of step S107 is that affects resulting from disturbances are being received, the processing moves to step S109, where the controller 8 determines whether or not the lane departure direction $D_{out}$ and the direction of the affected brake wheels match each other. When the directions do not match, the processing moves to a later-described step S112, and when the directions match, the processing moves to step S110, where the controller 8 determines whether or not only the front brake wheels are being affected.

When only the front brake wheels are being affected by disturbances, the processing moves to step S111 where, on the basis of Equations (13) and (14) below, the target brake hydraulic pressure differences $\Delta Ps_F$ and $\Delta Ps_R$ are calculated and set so that a difference is generated only in the braking force of the rear left and right wheels, and the processing moves to the later-described step S113.

$$\Delta Ps_F = 0 \quad (13)$$

$$\Delta Ps_R = 2 \cdot Kbr \cdot (|Ms| - Ms1)/T \quad (14)$$

When the front and rear brake wheels are being affected by disturbances, the processing moves to step S112 where, on the basis of Equations (15) and (16) below, the target brake hydraulic pressure differences $\Delta Ps_F$ and $\Delta Ps_R$ are set to zero and the processing moves to the later-described step S113.

$$\Delta Ps_F = 0 \quad (15)$$

$$\Delta Ps_R = 0 \quad (16)$$

In step S113, the target brake hydraulic pressure Pg for generating a braking force in both the left and right wheels is calculated on the basis of Equation (17) below with the aim of decelerating the host vehicle, and the processing moves to step S114 of FIG. 5.

$$Pg = K_{gv} \cdot V + K_{gx} \cdot dX \quad (17)$$

Here, the terms $K_{gv}$ and $K_{gx}$ are conversion factors when the braking force set in accordance with the vehicle velocity and the lateral displacement amount is converted to the brake hydraulic pressure. Also, the rear wheel target brake hydraulic pressure considering the longitudinal distribution calculated from the target brake hydraulic pressure Pg is represented by Pgr.

Next, the controller 8 determines, by the driving lane condition determination and the lane departure direction, whether or not to generate a braking force in both the left and right wheels with the aim of decelerating the host vehicle, and the target brake hydraulic pressure $Ps_j$ of each wheel is calculated in consideration of the master cylinder hydraulic pressure Pm that is a brake operation by the driver.

First, in step S114 of FIG. 5, the controller 8 determines whether or not the estimated time of departure $T_{out}$ is equal to or less than the braking determination threshold Tr (i.e., Tr<Ts) set in accordance with affects resulting from disturbances on the driving lane. When $T_{out}$>Tr, the processing moves to step S115, where the controller 8 determines in the same manner as in step S104 whether affects resulting from disturbances on the driving lane are being received.

When affects resulting from disturbances are not being received, the processing moves to step S116, where the controller 8 determines whether or not the target yaw moment Ms is negative, i.e., is about to be generated in the left direction. When Ms<0, the target brake hydraulic pressure $Ps_j$ of each wheel is calculated on the basis of Equation (18) below, and when Ms$\geq$0, the target brake hydraulic pressure $Ps_j$ of each wheel is calculated on the basis of Equation (19) below, the target brake hydraulic pressure calculation processing ends, and the processing returns to the predetermined main program.

$$Ps_{FL} = Pm,$$

$$Ps_{FR} = Pm + \Delta Ps_F,$$

$$Ps_{RL} = Pmr,$$

$$Ps_{RR} = Pmr + \Delta Ps_R \quad (18)$$

$$Ps_{FL} = Pm + \Delta Ps_F,$$

$$Ps_{FR} = Pm,$$

$$Ps_{RL} = Pmr + \Delta Ps_R$$

$$Ps_{RR} = Pmr \quad (19)$$

When the determination result of step S115 is that affects resulting from disturbances are being received, the processing moves to step S117, where the controller 8 determines whether or not the target yaw moment Ms is equal to or greater than the preset set value Ms1. When |Ms|<Ms1 occurs, the processing moves to step S119, and when $|Ms| \geq Ms1$ occurs, the processing moves to step S118.

In step S118, the controller 8 determines whether or not the lane departure direction $D_{out}$ and the direction of the affected brake wheels match and whether or not only the front brake wheels are being affected. When the directions match and only the front braked wheels are being affected, the processing moves to step S119.

In step S119, when Ms<0, the target brake hydraulic pressure $Ps_j$ of each wheel is calculated on the basis of Equation (20) below, and when $Ms \geq 0$, the target brake hydraulic pressure $Ps_j$ of each wheel is calculated on the basis of Equation (21) below, the target brake hydraulic pressure calculation processing ends, and the processing returns to the predetermined main program.

$Ps_{FL} = Pm + Pg/2$, $Ps_{FR} = Pm + \Delta Ps_F + Pg/2$, $Ps_{RL} = Pmr + Pgr/2$, $Ps_{RR} = Pmr + \Delta Ps_R + Pgr/2$ (20)

$Ps_{FL} = Pm + \Delta Ps_F + Pg/2$, $Ps_{FR} = Pm + Pg/2$ $Ps_{RL} = Pmr + \Delta Ps_R + Pgr/2$, $Ps_{RR} = Pmr + Pgr/2$ (21)

When the determination result of step S118 is that the directions do not match or that the front and rear brake wheels are not being affected, the processing moves to step S120 where, when Ms<0, the target brake hydraulic pressure $Ps_j$ of each wheel is calculated on the basis of Equation (22) below, and when $Ms \geq 0$, the target brake hydraulic pressure $Ps_j$ of each wheel is calculated on the basis of Equation (23) below, the target brake hydraulic pressure calculation processing ends, and the processing returns to the predetermined main program.

$Ps_{FL} = Pm + 2/3 \cdot Pg$, $Ps_{FR} = Pm + \Delta Ps_F + 2/3 \cdot Pg$, $Ps_{RL} = Pmr + 2/3 \cdot Pg$, $Ps_{RR} = Pmr + \Delta Ps_R + 2/3 \cdot Pg$ (22)

$Ps_{FL} = Pm + \Delta Ps_F + 2/3 \cdot Pg$, $Ps_{FR} = Pm + 2/3 \cdot Pg$, $Ps_{RL} = Pmr + \Delta Ps_R + 2/3 \cdot Pg$, $Ps_{RR} = Pmr + 2/3 \cdot Pg$ (23)

Also, when the determination result of step S114 is $T_{out} \leq Tr$, the processing moves to step S121, where the controller 8 determines whether or not affects resulting from disturbances on the driving lane are being received. When affects resulting from disturbances are not being received, the processing moves to step S122, where the target brake hydraulic pressure $Ps_j$ of each wheel is calculated on the basis of Equation (20) or (21) in the same manner as in step S119, the target brake hydraulic pressure processing ends, and the processing returns to the predetermined main program.

When the determination result of step S121 is that affects resulting from disturbances are being received, the processing moves to step S123, where the controller 8 determines whether or not the target yaw moment Ms is equal to or greater than the preset set value Ms1. When $|Ms| < Ms1$ occurs, the processing moves to step S125, and when $|Ms| \geq Ms1$ occurs, the processing moves to step S124.

In step S124, the controller 8 determines whether or not the lane departure direction $D_{out}$ and the direction of the affected brake wheels match and whether or not only the front brake wheels are being affected. When the directions match and only the front brake wheels are being affected, the processing moves to step S125.

In step S125, the target brake hydraulic pressure $Ps_j$ of each wheel is calculated on the basis of Equation (22) or (23) in the same manner as in step S120, the target brake hydraulic pressure calculation processing ends, and the processing returns to the predetermined main program.

Also, when the determination result of step S124 is that the directions do not match or the front and rear braked wheels are being affected, the processing moves to step S126. When Ms<0, the target brake hydraulic pressure $Ps_j$ of each wheel is calculated on the basis of Equation (24) below, and when $Ms \geq 0$, the target brake hydraulic pressure $Ps_j$ of each wheel is calculated on the basis of Equation (25) below, the target brake hydraulic pressure calculation processing ends, and the processing returns to the predetermined main program.

$Ps_{FL} = Pm + 3/4 \cdot Pg$, $Ps_{FR} = Pm + \Delta Ps_F + 3/4 \cdot Pg$, $Ps_{RL} = Pmr + 3/4 \cdot Pg$, $Ps_{RR} = Pmr + \Delta Ps_R + 3/4 \cdot Pg$ (24)

$Ps_{FL} = Pm + \Delta Ps_F + 3/4 \cdot Pg$, $Ps_{FR} = Pm + 3/4 \cdot Pg$, $Ps_{RL} = Pmr + \Delta Ps_R + 3/4 \cdot Pg$, $Ps_{RR} = Pmr + 3/4 \cdot Pg$ (25)

In the lane departure prevention control processing of FIGS. 2 to 5, the processing of steps S4 and S5 corresponds to a lane departure determining section. The processing of steps S31 and S32 corresponds to a running condition (unevenness) detecting section. The processing of steps S36 and S37 corresponds to a low μ detecting section, the processing of step S11 corresponds to a lane change determining section. The processing of steps S15, S17, S19, S20, and S103 to S112 corresponds to a yaw control amount calculating section. The processing of step S113 corresponds to a braking control amount calculating section. The processing of steps S114 to S126 corresponds to a brake driving force control section.

Thus, now, it will be assumed that the host vehicle is driving straight along the driving lane without receiving disturbances on the driving lane. In this case, because the estimated time of departure $T_{out}$ where $T_{out} \geq Ts$ is calculated in step S4 in the lane departure prevention control processing of FIGS. 2 to 5, the processing moves from step S5 to step S6, where the lane departure determination flag $F_{out} = 0$ and the condition is one representing that the host vehicle is not in a lane departure tendency. Thus, the processing moves to step S102 by the determination of step S101 of FIG. 4, the master cylinder pressures Pm and Pmr corresponding to the brake operation of the driver are respectively set for the target braking pressures $Ps_{FL}$ to $Ps_{RR}$ of the wheels 5FL to 5RR, and the driving state corresponding to the steering operation of the driver is continued.

It will be assumed that, from this state, the host vehicle gradually begins to depart in the left direction from the center position of the driving lane due to inattentive driving by the driver. In this case, because the estimated time of departure $T_{out}$ where $T_{out}<Ts$ is calculated in step S4, the lane departure determination flag $F_{out}=1$ in step S7, and the condition is one representing that the host vehicle is in a lane departure tendency. Because there is no intent to change lanes on the part of the driver, the lane change flag $F_{ch}=0$ in step S12 from step S11, the processing moves to step S14 via step S13, the lane departure alarm is issued to the driver, and the target yaw moment Ms in the lane departure avoidance direction is calculated in step S15 on the basis of Equation (3). In this case, when the estimated time of departure $T_{out}$ where $T_{out}>Tr$ is being calculated, departure prevention control is conducted by only the yaw moment control, and the right-side target brake hydraulic pressures $Ps_{FR}$ and $Ps_{RR}$ are set to be large on the basis of Equation (18) in step S116 of FIG. 5 so that the target yaw moment Ms is generated, whereby course correction in the right direction, which is the lane departure avoidance direction, is precisely conducted.

When the estimated time of departure $T_{out}$ where $T_{out} \leq Tr$ is being calculated, the lane departure prevention control is conducted by both the yaw moment control and the deceleration control, the right-side target brake hydraulic pressures $Ps_{FR}$ and $Ps_{RR}$ are set to be large on the basis of Equation (20) in step S122 on the basis of the target yaw moment Ms and the target brake hydraulic pressure Pg, and the braking force for deceleration control is generated in both the left and right wheels, whereby course correction in the right direction, which is the lane departure avoidance direction, is precisely conducted.

In this manner, because yaw control and deceleration control are combined to conduct departure prevention control in accordance with the lane departure condition of the host vehicle, departure prevention can be precisely conducted by the braking force by the deceleration control, even in a case where the wheels to which braking is applied have an insufficient grip and the lane has been departed from due to an insufficient yaw moment by the yaw control.

Figure 6:
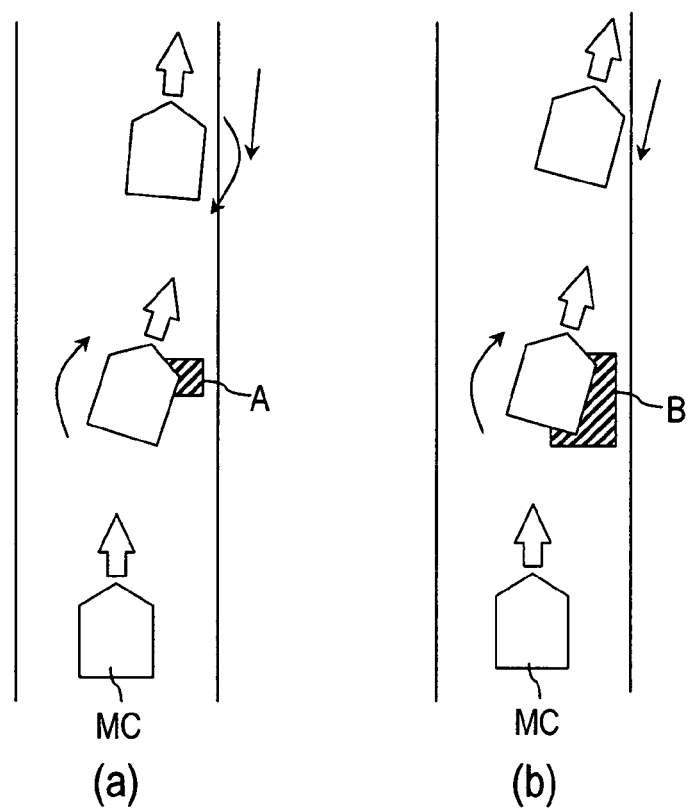
FIG. 6 is a first diagram illustrating a host vehicle operating with the lane departure prevention apparatus of FIG. 1 in accordance with the first embodiment of the present invention.

It will be assumed that, when the host vehicle MC is driving straight along the driving lane, as shown in diagram (a) of FIG. 6, the right front wheel is affected by unevenness A in the vehicle driving lane, the vehicle behavior changes and the vehicle is in a rightward departure tendency. In this case, because the stroke amount $St_{FR}$ where $St_{FR} \geq St_S$ is detected by the suspension stroke sensor 23 and the stroke velocity $St_{FR}'$ is such that $St_{FR}' \geq Sv_S$, the unevenness affect flag $Fr_{FR}=1$ in step S32 of FIG. 3, the condition becomes one representing that the affects of the unevenness are being received, the lane departure determination threshold Ts is set to the value Ts1 smaller than the ordinary departure determination threshold, and the braking determination threshold Tr is set to the value Tr1 smaller than the ordinary braking determination threshold. Then, the estimated time of departure $T_{out}$ is calculated from the variation amount of the lateral displacement and the distance to the lane in step S4, and this estimated time of departure $T_{out}$ is compared with the lane departure determination threshold Ts set in step S32, whereby the determination of lane departure is conducted.

In this manner, because the lane departure determination threshold Ts is set to be smaller than the ordinary value when affects resulting from unevenness on the host vehicle driving lane are being received, the lane departure determination can be suppressed in comparison to, for example, the case of ordinary lane departure resulting from inattentive driving by the driver, and departure prevention control can be appropriately conducted without the driver feeling discomfort.

Figure 2:
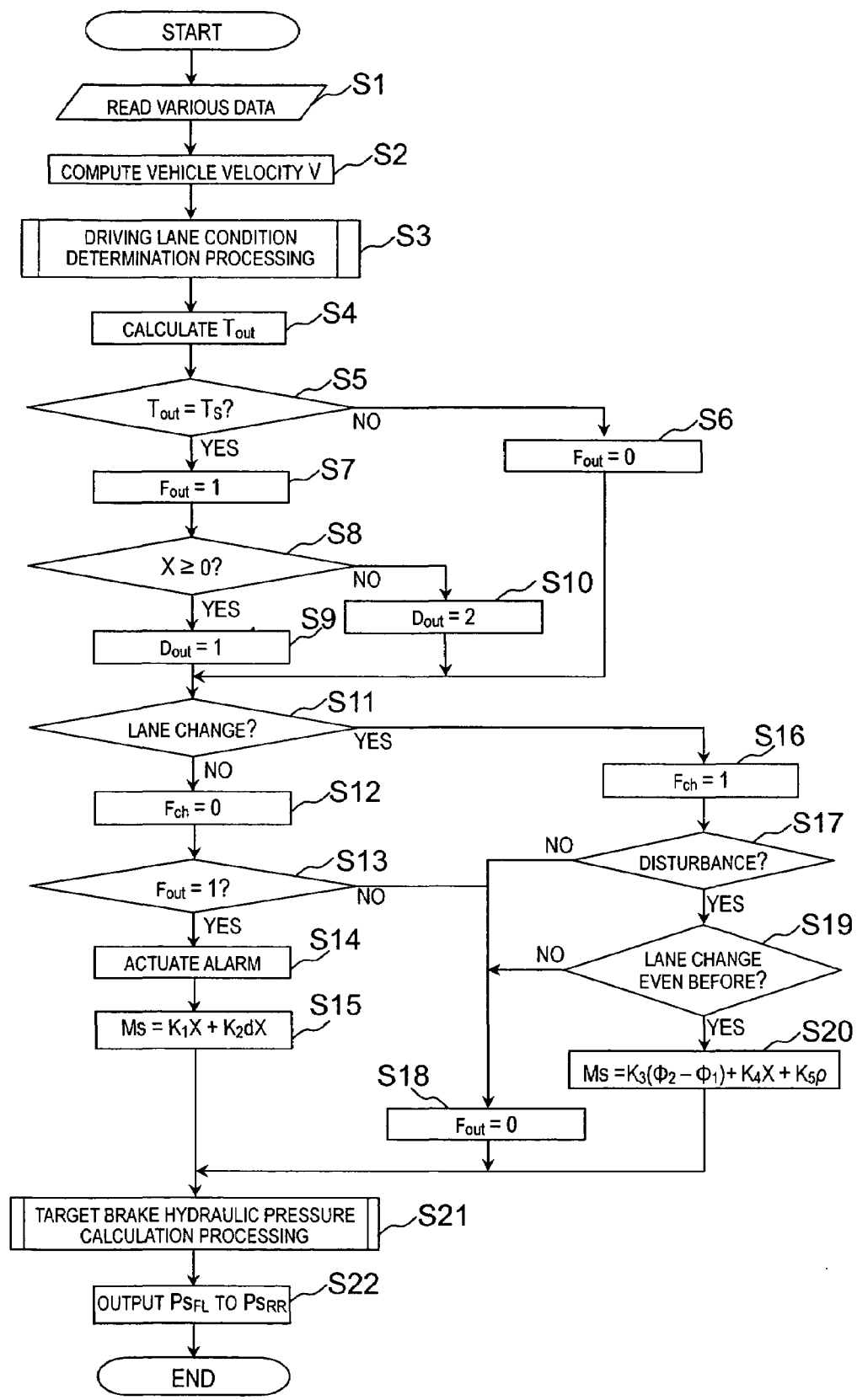
FIG. 2 is a flowchart showing the processing content executed by a driving/braking force control unit as a component of the lane departure prevention apparatus of FIG. 1 in accordance with the first embodiment of the present invention.

Additionally, when the controller 8 determines in step S5 of FIG. 2 that $T_{out}<Ts$, the lane departure determination flag $F_{out}=1$ in step S7 and the condition becomes one representing that the host vehicle is in a lane departure tendency. Because there is no intent to change lanes on the part of the driver, the lane change flag $F_{ch}=0$ in step S12 from step S11, the lane departure alarm is issued to the driver in step S14 via step S13, and the target yaw moment Ms in the lane departure avoidance direction is calculated in step S15 on the basis of Equation (3)

Because the lane departure direction is to the right side and the wheel receiving the affects of the disturbance is the right front wheel, the lane departure direction $D_{out}$ and the direction of the brake wheel receiving the affects match. Thus, when the target yaw moment Ms is such that $|Ms| \geq Ms_1$, the target brake hydraulic pressure differences $\Delta Ps_F$ and $\Delta Ps_R$ for generating the difference in the braking force of the rear left and right wheels are calculated in step S111 of FIG. 4 on the basis of Equations (13) and (14). Moreover, when $T_{out}>Tr$, the target brake hydraulic pressure $Ps_{RL}$ of the left rear wheel is set to be large on the basis of Equation (21) in step S119 of FIG. 5, and the braking force for deceleration control is generated in both the left and right wheels, whereby course correction in the left direction, which is the lane departure avoidance direction, is precisely conducted.

Also, as shown in diagram (b) of FIG. 6, it will be assumed that the right front and rear wheels receive affects due to unevenness B in the host vehicle driving lane, the vehicle behavior changes, and the vehicle is in a rightward departure tendency. In this case, the controller 8 determines that the front and rear brake wheels are receiving the affects of disturbances on the driving lane by the determination of step S110 of FIG. 4, and the target brake hydraulic pressure differences $\Delta Ps_F$ and $\Delta Ps_R$ are set to zero in step S112 on the basis of Equations (15) and (16). Thus, when $T_{out}>Tr$, the braking force for deceleration control is generated in both the left and right wheels on the basis of Equation (21) in step S119 of FIG. 5, whereby the braking force is generated in the host vehicle and lane departure is prevented.

In this manner, when affects resulting from disturbances on the driving lane are being received, the target brake hydraulic pressure differences $\Delta Ps_F$ and $\Delta Ps_R$ are calculated in consideration of the brake wheels receiving the affects. Thus, when, for example, only the front wheels are receiving the affects, the target brake hydraulic pressure of the rear wheels is set to be large by the yaw control and deceleration control is conducted, and when the front and rear wheels are receiving the affects, the yaw control is not conducted and the lane departure prevention control is conducted by only the deceleration control, whereby lane departure resulting from the wheels to which braking is applied having an insufficient grip and the yaw moment by yaw control being insufficient can be prevented, and lane departure can be precisely prevented by increasing the braking force by deceleration control.

Figure 7:
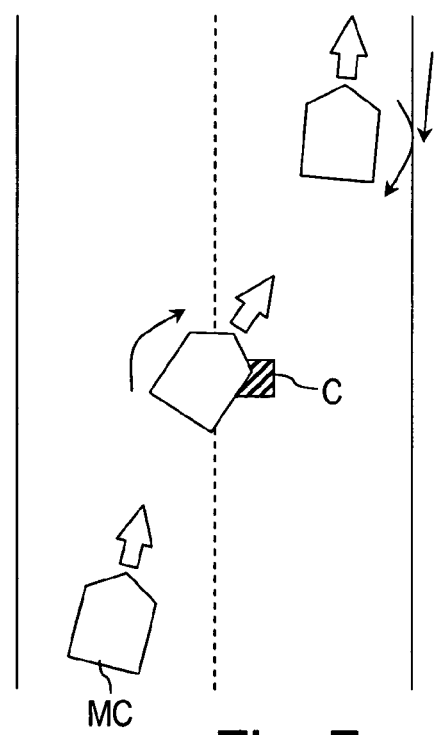
FIG. 7 is a second diagram illustrating a host vehicle operating with the lane departure prevention apparatus of FIG. 1 in accordance with the first embodiment of the present invention.

Also, it will be assumed that the driver operates the direction indication switch 22 and the host vehicle MC is about to change lanes to the adjacent lane. In this state, as shown in FIG. 7, when the right front wheel receives affects due to unevenness C in the driving lane and the vehicle behavior changes and the vehicle is in a rightward departure tendency, the processing moves from step S31 to step S32, the unevenness affect flag $Fr_{FR}=1$, and the condition is one representing that the affects of unevenness are being received. Then, the controller 8 determines in step S11 of FIG. 2 that it is the intent of the driver to change lanes, the lane change flag $F_{ch}=1$ in step S16, the processing moves to step S17 and the unevenness flag $Fr_{FR}=1$, whereby the processing moves to step S19. Because there is the intent to change lanes before the affects resulting from the disturbance are received, the processing moves from step S19 to step S20, and the target yaw moment Ms is calculated on the basis of Equation (4).

Thus, in a case where the affects are being received due to a disturbance on the driving lane when changing lanes and there was the intent to change lanes even before the disturbance affects were received, the target yaw moment is set to the extent that it returns the vehicle to the vehicle orientation prior to receiving the affects, whereby lane changing can be smoothly conducted and departure prevention control can be conducted without the driver feeling discomfort.

In this manner, in the present embodiment, the vehicle behavior resulting from disturbances such as unevenness and a low friction coefficient of the host vehicle driving lane is detected, and when the controller 8 determines that affects resulting from disturbances are being received, the lane departure determination threshold is changed and departure determination is conducted. Thus, for example, departure determination can be suppressed in comparison to the case of ordinary lane departure resulting from inattentive driving by the driver, and appropriate departure prevention control in accordance with the condition can be conducted.

Also, when the affects of disturbances on the driving lane have been received, the controller 8 determines that those affects will continue to be received for a predetermined time, whereby it can be precisely determined whether or not the lane departure is a lane departure resulting from the affects of the disturbances, and departure prevention control can be conducted without the driver feeling discomfort.

Moreover, yaw control and deceleration control are combined to conduct departure prevention control in accordance with the lane departure condition of the host vehicle, and when affects resulting from disturbances on the driving lane are being received, the target brake hydraulic pressure is calculated in accordance with the brake wheels receiving the affects and departure prevention control is conducted, whereby lane departure resulting from the wheels to which braking is applied having an insufficient grip and the yaw moment by yaw control being insufficient can be prevented.

Also, when affects resulting from disturbances on the driving lane are being received, the braking force in the deceleration control is set to be large in comparison to the case where disturbance affects are not being received, and when the front and rear wheels are receiving disturbance affects, the braking force in the deceleration control is set to be large in comparison to the case where only the front wheels are receiving disturbance affects. Thus, lane departure can be precisely prevented.

Moreover, when affects are being received due to disturbances on the driving lane when changing lanes, the controller 8 determines whether or not there was the intent to change lanes prior to receiving the disturbance affects, and when there was the intent to change lanes prior to the disturbance affects, the target yaw moment is set to return the vehicle to the vehicle orientation prior to receiving the disturbance affects. Thus, lane changing can be smoothly conducted, and departure prevention control can be conducted without the driver feeling discomfort.

Also, because the invention is configured so that the braking pressures $Ps_{FL}$ to $Ps_{RR}$ of the wheels 5FL to 5RR are individually controlled to generate the yaw moment Ms in the lane departure avoidance direction, the vehicle course can be precisely corrected to the lane departure avoidance direction.

In the above-described embodiment, a case was described where the velocity of the host vehicle was calculated on the basis of each wheel velocity detected by the vehicle speed sensor, but the invention is not limited thereto. In a case where ABS control is operating, the invention may be configured so that an estimated vehicle velocity estimated within the ABS control is applied, or in a case where a navigation system is disposed, a value used by the navigation system may be applied.

Also, in the above-described embodiment, a case was described where the target yaw moment was calculated on the basis of Equation (3) in step S15 of FIG. 2, but the invention is not limited thereto. The target yaw moment may also be calculated on the basis of the following equation based on the yaw angle Φ with respect to the driving lane of the host vehicle, the lateral displacement X and the driving lane curvature ρ.

$$Ms = K_a \cdot \Phi + K_b \cdot X + K_c \cdot \rho \qquad (26)$$

Here, the terms $K_a$, $K_b$ and $K_c$ are gains that vary or fluctuate in accordance with the vehicle velocity V.

Moreover, in the above-described embodiment, a case was described where the target brake hydraulic pressure was calculated on the basis of Equation (17) in step S113 of FIG. 4, but the invention is not limited thereto. The target brake hydraulic pressure can also be calculated on the basis of the following equation based on the vehicle velocity V, the yaw angle Φ with respect to the driving lane of the host vehicle, and the driving lane curvature ρ.

$$Pg = K_{gv} \cdot V + K_{gf} \cdot \Phi + K_{gr} \cdot \rho \qquad (27)$$

Here, the terms $K_{gf}$ and $K_{gr}$ are conversion factors when the braking force set in accordance with the yaw angle Φ and the driving lane curvature is converted to the brake hydraulic pressure.

Also, in the above-described embodiment, a case was described where an alarm was issued when the driver was not changing lanes and the vehicle was in a lane departure tendency, but the invention is not limited thereto. A shift may be generated in the timing at which the alarm is issued and the timing at which braking control (yaw control and deceleration control) is conducted. Because G is applied to the driver by using the braking control, this braking control itself can include the alarm effect.

Moreover, in the above-described embodiment, a case was described where the longitudinal acceleration, the lateral acceleration and the yaw rate φ were detected by the navigation system disposed in the host vehicle, but the invention is not limited thereto. Sensors that detect each of these may be applied, such as disposing acceleration sensors to detect the longitudinal acceleration and the lateral acceleration, and disposing a yaw rate sensor to detect the yaw rate φ.

Also, in the above-described embodiment, a configuration was described where only the braking pressures $Ps_{FL}$ to $Ps_{RR}$ of the wheels 5FL to 5RR were controlled to generate in the host vehicle the yaw moment Ms in the lane departure avoidance direction, but the invention is not limited thereto. When a driving force control apparatus that can control the driving force of the wheels 5FL to 5RR is disposed, the yaw moment Ms in the lane departure avoidance direction may be generated by controlling the braking pressures and the driving forces of the wheels 5FL to 5RR.

Moreover, in the above-described embodiment, a case was described where the invention was applied to a rear wheel drive vehicle, but the invention can also be applied to a front wheel drive vehicle. In this case, of the wheel velocities $Vw_{FL}$ to $Vw_{RR}$, the velocity V of the host vehicle may be calculated in step S2 from the average value of the velocities $Vw_{RL}$ and $Vw_{RR}$ of the rear left and right wheels, which are the non-driven wheels.

Second Embodiment

Figure 8:
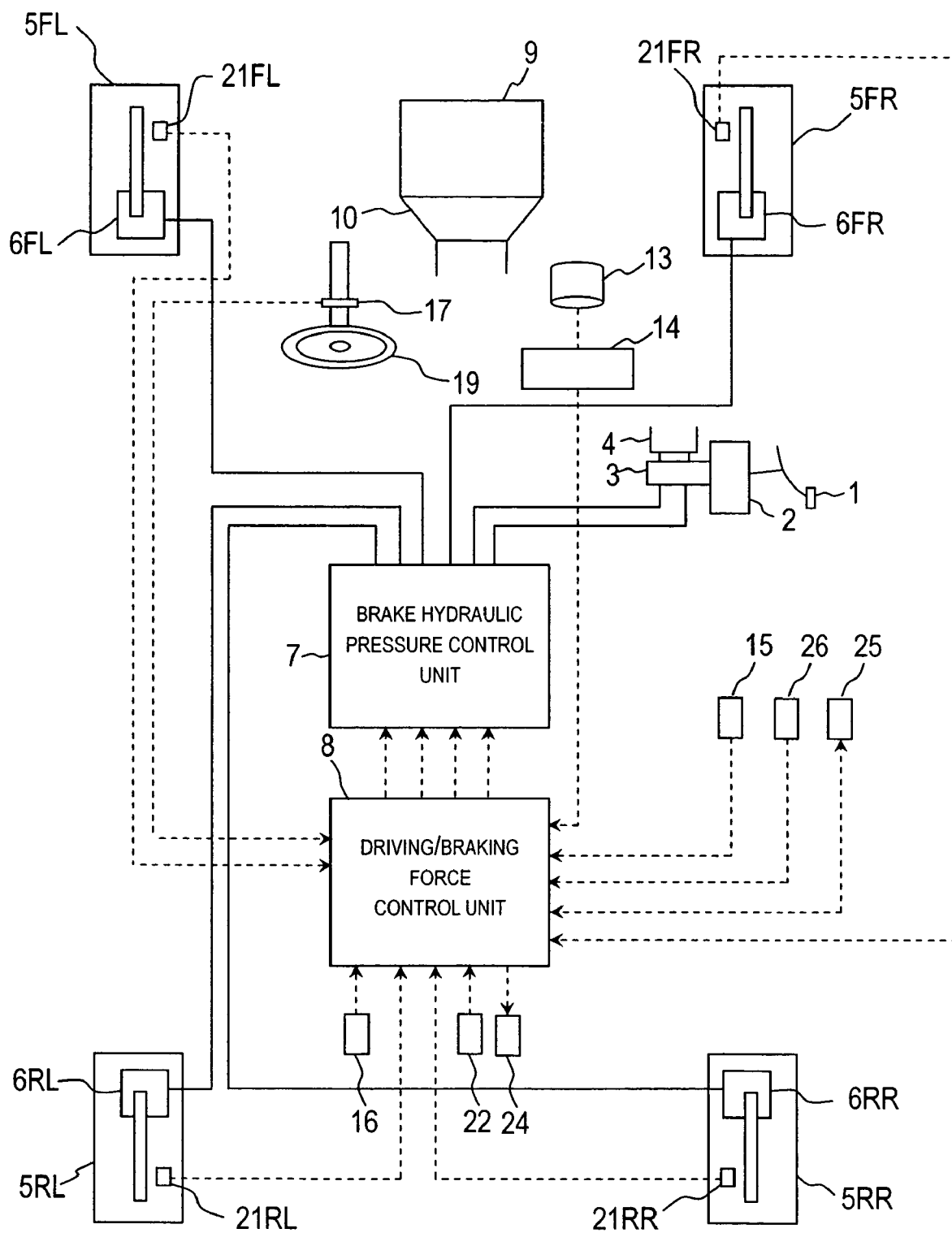
FIG. 8 is a schematic structural diagram of a vehicle equipped with a lane departure prevention apparatus in accordance with a second embodiment of the present invention.

Referring now to FIGS. 8–15, a vehicle equipped with a lane departure prevention apparatus in accordance with a second embodiment will now be explained. The schematic structural diagram of a host vehicle illustrated in FIG. 8 is equipped with the lane departure prevention apparatus in accordance with the second embodiment of the present invention. In view of the similarity between the first and second embodiments, the parts or steps of the second embodiment that are identical to the parts or steps of the first embodiment will be given the same reference numerals as the parts of the first embodiment. Moreover, the descriptions of the parts or steps of the second embodiment that are identical to the parts or steps of the first embodiment may be omitted for the sake of brevity. In other words, unless otherwise specified, the rest of the configuration of the vehicle in the second embodiment is the same as the configuration of the first embodiment.

In this second embodiment, the host vehicle is preferably equipped with all of the features of the first embodiment, but also further includes a storage device 25 and a wiper switch 26 that detects a wiper operation. A detection signal is outputted from the wiper switch 26 to the controller 8 that is indicative of the wipers of the host vehicle being in an operating state or a non-operating state.

The controller 8 of this second embodiment is configured to conduct a lane departure determination on the basis of the running condition of the host vehicle such as the road surface friction coefficient of the host vehicle driving road. When the host vehicle is in a tendency to depart from the driving lane, the control amounts of the yaw control and the deceleration control are calculated in consideration of the road surface friction coefficient of the host vehicle driving road, and braking control is conducted. When the road surface friction coefficient is low, lane departure can be appropriately prevented by quickening the timing at which departure control is initiated, and a feeling of discomfort given to the passengers resulting from the vehicle behavior at the time the yaw moment is generated can be prevented by setting the yaw moment generated in the vehicle to be small.

Now, the lane departure prevention control processing conducted by the controller 8 will be described in accordance with the flowcharts of FIGS. 9 and 10. Similar to the first embodiment, the lane departure prevention control processing of the second embodiment is executed by timer interruption processing every 10 msec, for example. Communication processing is not included in the processing shown in FIGS. 9 and 10, but the information obtained by computational processing is updated and stored in random access memory, and required information is read out from the random access memory when required.

Figure 9:
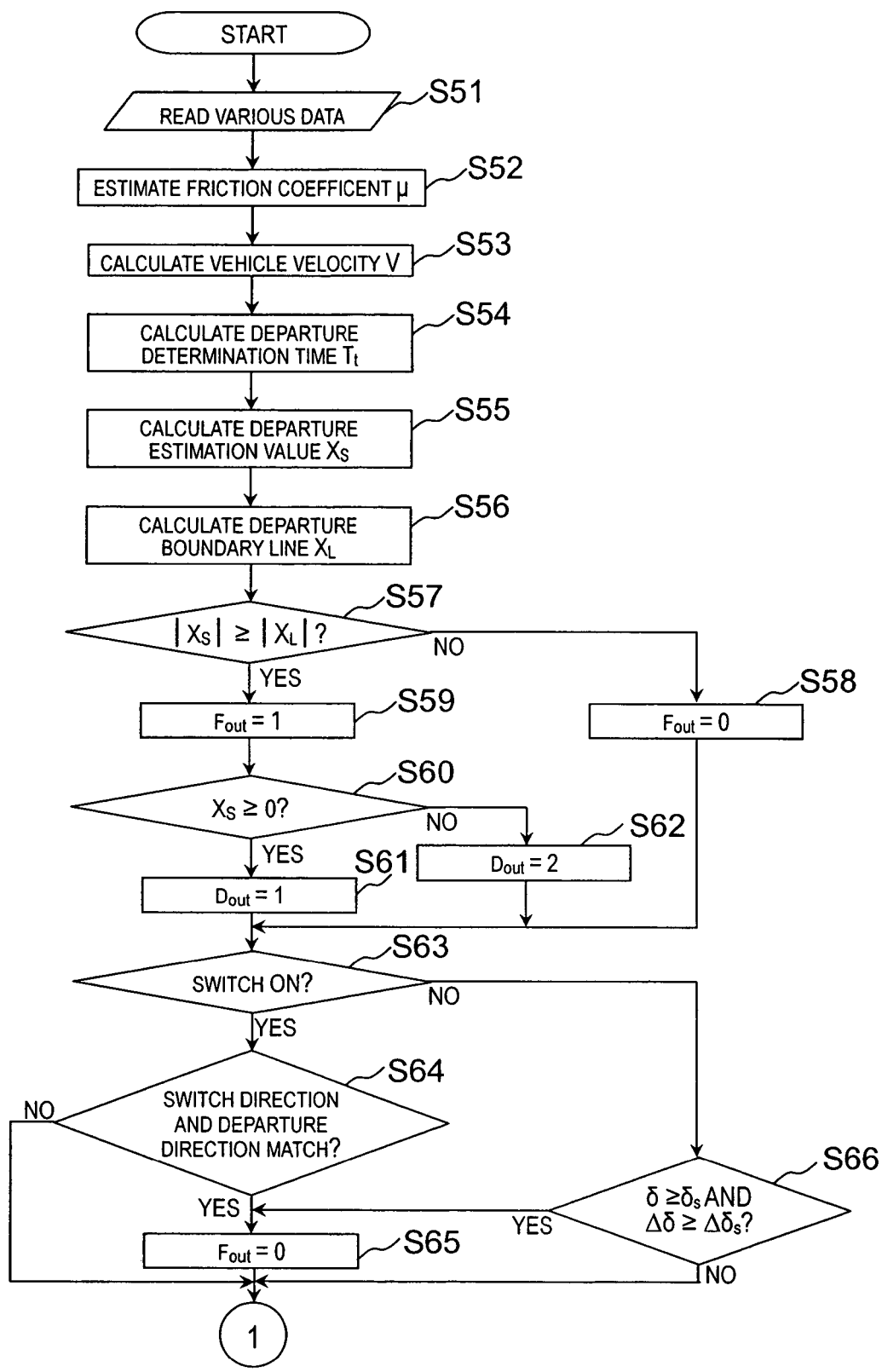
FIG. 9 is a first part of a flowchart showing the processing content executed by a driving/braking force control unit as a component of the lane departure prevention apparatus of FIG. 8 in accordance with the second embodiment of the present invention.

First, in step S51 of FIG. 9, various data from the sensors and controller are read by the controller 8. Specifically, each wheel velocity Vwi detected by the sensors, the master cylinder pressure Pm, the steering angle δ, the direction indication switch signal WS, the stroke amount $St_j$, the vehicle yaw angle Φ with respect to the driving lane from the camera controller 14, the lateral displacement X from the driving lane center, the driving lane curvature ρ, and the driving lane width L are all read by the controller 8. Thus, the processing of step S51 of FIG. 9 constitutes a running condition detecting section.

Next, the processing moves to step S52, where the road surface friction coefficient μ stored in the storage device 25 is read by the controller 8. This road surface friction coefficient μ is estimated by an ABS system at the time of the brake operation by the driver, and the most recent value of the road surface friction coefficient μ is stored in the storage device 25. Alternatively several estimated friction coefficients over a predetermined time or a predetermined driving distance from the current point in time are be stored, and the average value or the lowest value of the stored friction coefficients are used as the road surface friction coefficient μ.

Next, in step S53, the host vehicle velocity V is calculated based on the average value of the wheel velocities of the non-driven wheels. In the illustrated embodiment, the host vehicle is driven by the rear wheels, so the host vehicle velocity V is calculated based on the velocities $Vw_{FL}$ and $Vw_{FR}$ of the front left and right wheels 5FL and 5FR. Thus, in the illustrated embodiment, the host vehicle velocity V is calculated using Equation (1), as previously mentioned, from the average value of the velocities $Vw_{FL}$ and $Vw_{FR}$ of the front left and right wheels, which are the non-driven wheels.

Figure 11:
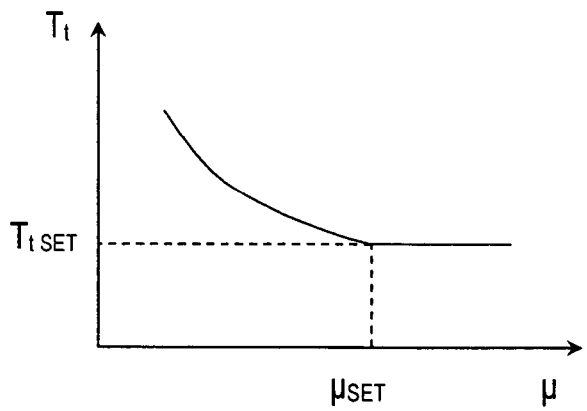
FIG. 11 is a lane departure determination time calculation map used in the processing content executed by the driving/braking force control unit of the lane departure prevention apparatus of FIG. 8 in accordance with the second embodiment of the present invention.

In step S54, the lane departure determination time calculation map shown in FIG. 11 is referenced by the controller 8, and the time Tt (sec) until the host vehicle departs from the driving lane is calculated in accordance with the road surface friction coefficient μ estimated in step S52. This lane departure determination time calculation map of FIG. 11 is set so that the lane departure determination time Tt is set to a predetermined time $Tt_{SET}$ when the road surface friction coefficient μ is higher than a predetermined value $μ_{SET}$ and so that the lane departure determination time Tt is calculated to be greater than the time $Tt_{SET}$ as the road surface friction coefficient μ becomes smaller when the road surface friction coefficient μ is equal to or less than the time $Tt_{SET}$. Here, the predetermined value $μ_{SET}$ is a target road surface friction coefficient where the controller 8 determines that the brake operation can be conducted without giving the passengers a feeling of discomfort.

Figure 12:
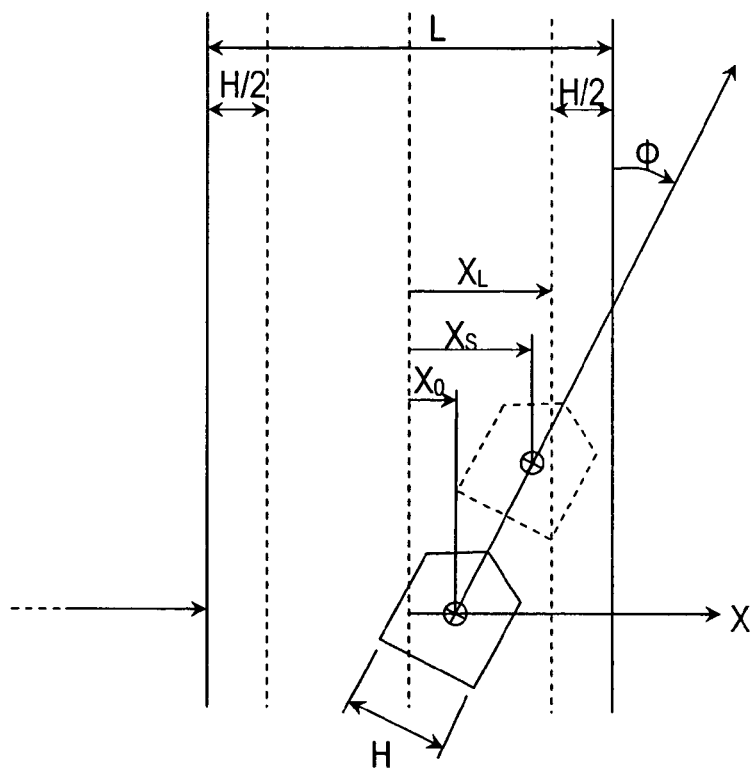
FIG. 12 is a diagram illustrating a lane departure estimation value of a host vehicle operating with the lane departure prevention apparatus of FIG. 8 in accordance with the second embodiment of the present invention.

Next, in step S55, as shown in FIG. 12, an estimated lateral displacement after the predetermined time, i.e., the lane departure estimation value $X_S$ is calculated. Specifically, the lane departure estimation value $X_S$ is calculated in accordance with the following Equation (28):

$$X_S = dx \times Tt \times X \qquad (28)$$

Thus, the lane departure estimation value $X_S$ is calculated based on the lateral displacement X of the host vehicle from the driving lane center read in step S51, the lateral displacement velocity dX calculated by differentiating the lateral displacement X, and the lane departure determination time Tt calculated in step S54.

Alternatively, the lane departure estimation value $X_S$ is calculated in accordance with the following Equation (29):

$$X_S = Tt \times V \times (\Phi + Tt \times V \times \rho) + X \qquad (29)$$

Thus, the lane departure estimation value $X_S$ is calculated based on the vehicle yaw angle Φ with respect to the driving lane of the host vehicle read in step S51, the lateral displacement X from the driving lane center, the driving lane curvature ρ, and the host vehicle velocity V calculated in step S53.

Preferably, the lane departure estimation value $X_S$ is a positive value when departing in the left direction and a negative value when departing in the right direction. Then, the processing moves to step S56.

Lane departure of the host vehicle is determined by comparing this lane departure estimation value $X_S$ with a position of a boundary line that is spaced from the vehicle center of gravity in the driving lane, i.e., the lane departure boundary line $X_L$. First, the lane departure boundary line $X_L$ is calculated in step S56. The lane departure boundary line $X_L$ is expressed by the following Equation (30):

$$X_L = \pm(L-H)/2 \quad (30)$$

In Equation (4), the lane departure boundary line $X_L$ is calculated based on the driving lane width L and the host vehicle width H. The measurement of the lane departure boundary line $X_L$ from the left side of the center of the driving lane is a positive value.

Next, in step S57, the controller 8 determines whether or not the absolute value $|X_S|$ of the lane departure estimation value $X_S$ is equal to or greater than the absolute value $|X_L|$ of the lane departure boundary line $X_L$. When $|X_S|<|X_L|$ occurs, the processing moves to step S58, where the lane departure determination flag $F_{out}$ is reset to "0" meaning that the host vehicle is not in a lane departure tendency. Thus, the processing moves to a later-described step S63.

However, when $|X_S| \geq |X_L|$ occurs, the processing moves to step S59, where the lane departure determination flag $F_{out}$ is set to "1" meaning that the host vehicle is in a lane departure tendency. Thus, the processing moves to step S60, where the controller 8 determines whether the lane departure estimation value XS is positive or negative. Then, when $X_S \geq 0$ is occurring, the controller 8 determines that the lane departure is to the left side, and then the processing moves to step S61, where the lane departure direction flag $D_{out}$ is set to "1". When $X_S<0$ is occurring, the controller 8 determines that the lane departure is to the right side, and then the processing moves to step S62, where the lane departure direction flag $D_{out}$ is set to "2". From steps S61 and S62, the processing moves to step S63.

Next, the intent of the driver to change lanes is determined by detecting the direction indication (turn signal) switch signal WS from the direction indication (turn signal) switch 22 and the steering angle δ from the steering angle 17. First, in step S63, the controller 8 determines whether or not the direction indication switch 22 is ON. When the direction indication switch is ON, the processing moves to step S64, where the controller 8 determines whether or not the operation direction of the direction indication switch 22 and the lane departure direction determined by the lane departure direction flag $D_{out}$ match. When both directions match, the controller 8 determines an intention of the driver exists to change lanes. Thus, the processing moves to step S65, where the lane departure determination flag $F_{out}$ is reset to "0", and the processing moves to a later-described step S67. When both directions do not match, the controller 8 determines that the driver does not intent to change lanes and the processing moves to the later-described step S67.

However, when the determination result of step S63 is that the direction indication switch 22 is OFF, then the processing moves to step S66, where the controller 8 determines whether or not the steering angle δ is equal to or greater than a preset steering angle set value δs and whether or not the steering angle variation amount Δδ is equal to or greater than a preset variation amount set value Δδs. When δ≧δs and Δδ≧Δδs are occurring, the controller 8 determines that it is the intent of the driver to change lanes and the processing moves to step S65. When δ<δs or Δδ<Δδs are occurring, the controller 8 determines that it is not the intent of the driver to change lanes and the processing moves to step S67.

Here, the intent of the driver to change lanes is determined on the basis of the steering angle δ and the steering angle variation amount Δδ, but the invention is not limited thereto. For example, the intent of the driver to change lanes can also be determined by detecting the steering torque.

Figure 10:
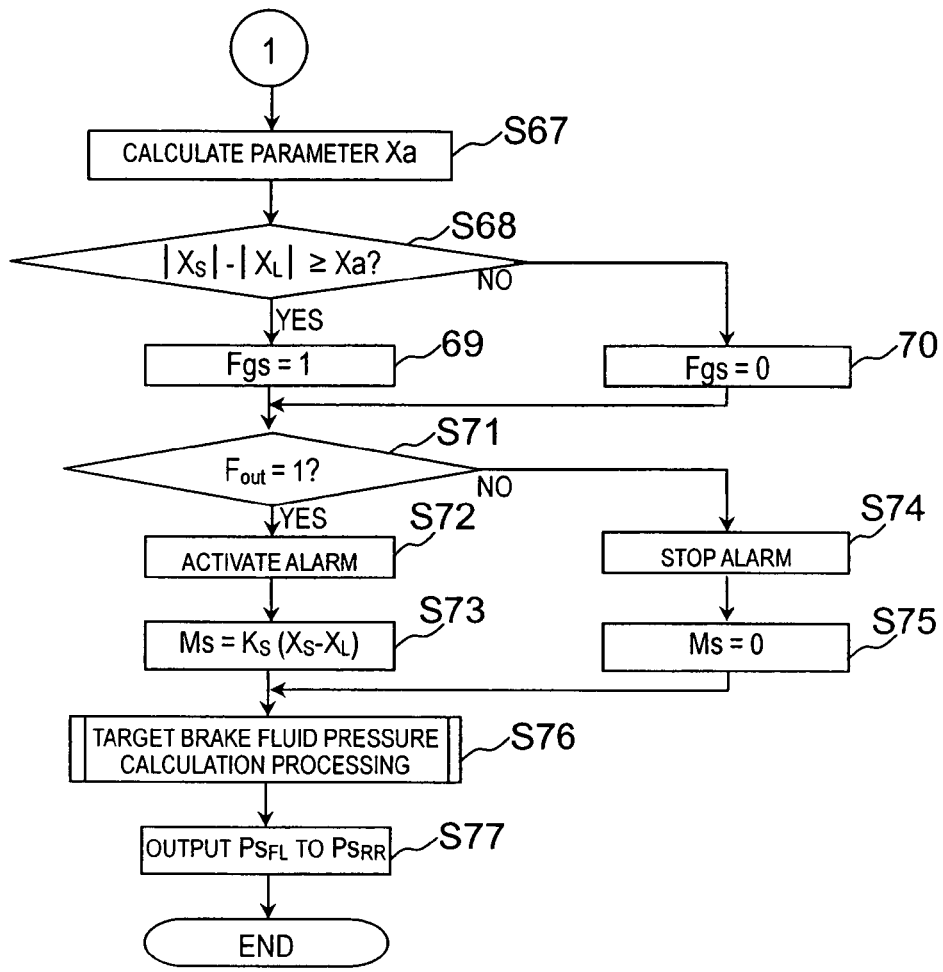
FIG. 10 is a second part of a flowchart showing the processing content executed by the driving/braking force control unit as a component of the lane departure prevention apparatus of FIG. 8 in accordance with the second embodiment of the present invention.
Figure 13:
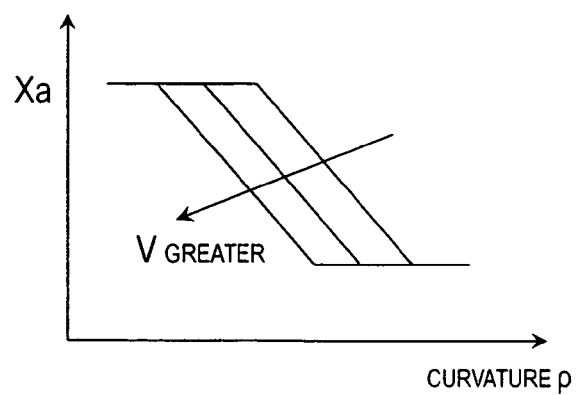
FIG. 13 is a parameter calculation map used in the processing content executed by the driving/braking force control unit of the lane departure prevention apparatus of FIG. 8 in accordance with the second embodiment of the present invention.
Figure 14:
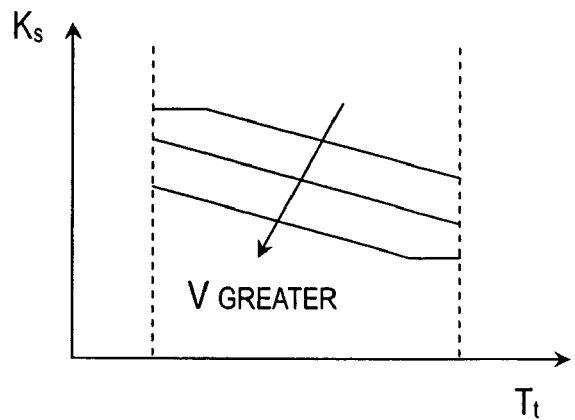
FIG. 14 is a gain calculation map used in the processing content executed by the driving/braking force control unit of the lane departure prevention apparatus of FIG. 8 in accordance with the second embodiment of the present invention.

In step S67 of FIG. 10, the parameter calculation map shown in FIG. 13 is referenced by the controller 8 and the parameter Xa, which is a threshold determining the necessity of deceleration control, is calculated on the basis of the lane curvature ρ and the vehicle velocity V. This parameter calculation map shown in FIG. 13 is set so that the parameter Xa is calculated to be small as the curvature ρ becomes larger and the vehicle velocity V becomes faster.

Next, in step S68, the controller 8 determines whether or not the calculated value $|X_S|-|X_L|$ (the absolute value of the lane departure boundary line $X_L$ subtracted from the absolute value of the lane departure estimation value $X_S$) is equal to or greater than the parameter Xa calculated in step S67. When $|X_S|-|X_L| \geq Xa$ is occurring, i.e., when the lane departure estimation value $X_S$ departs from the lane departure boundary line $X_L$ by Xa or greater, the controller 8 determines that deceleration control of the host vehicle is necessary, the processing moves to step S69, where the deceleration control actuation flag Fgs is set to "1", and the processing moves to a later-described step S71. Also, when the determination result of step S68 is that $|X_S|-|X_L|<Xa$ is occurring, the processing moves to step S70, where the deceleration control actuation flag Fgs is set to "0", and the processing moves to step S71.

Because the deceleration control actuation flag Fgs is set in this manner, when, for example, the curvature ρ of the driving lane in front of the host vehicle is gradual and the lane departure estimation value $X_S$ is small (Fgs=0), the host vehicle does not end up decelerating and a feeling of discomfort is not given to the passengers.

Also, because the deceleration control actuation flag Fgs is set so that the parameter Xa becomes smaller as the curvature ρ of the driving lane of the host vehicle becomes larger, when, for example, a sudden curve appears in front of the host vehicle ($|X_S|-|X_L| \geq Xa$, and the deceleration control actuation flag Fgs is set to "1"), the host vehicle decelerates and an increase in the lane departure estimation value $X_S$ is suppressed.

Moreover, because the deceleration control actuation flag Fgs is set so that the parameter Xa becomes smaller as the curvature ρ of the driving lane of the host vehicle becomes larger, when, for example, the host vehicle is running at a high speed, $|X_S|-|X_L| \geq Xa$, and the deceleration control actuation flag Fgs is set to "1", the host vehicle decelerates and an increase in the lane departure estimation value $X_S$ is suppressed.

In step S71, the controller 8 determines whether or not the lane departure determination flag $F_{out}$ is set to "1" meaning that there is a lane departure tendency in the host vehicle. When $F_{out}=1$, the processing moves to step S72, where the alarm signal AL is outputted to the alarm device 24, such that the alarm device 24 is activated to produce an audible sound and/or visual indication to the driver. Then, the processing of the controller 8 moves to step S73.

In step S73, the target yaw moment Ms is calculated using Equation (31) as follows:

$$Ms = Ks \times (X_S - X_L) \qquad (31)$$

In Equation (31), the gain Ks is a positive value that varies in accordance with the vehicle velocity V and the lane departure determination time Tt. Preferably, the gain Ks is calculated with reference to the gain calculation map shown in FIG. 14 on the basis of the vehicle velocity V and the lane departure determination time Tt. This gain calculation map is set so that the gain Ks is calculated to be small as the vehicle velocity becomes faster and the time until departure becomes longer. Then, the processing of the controller 8 moves to a later-described step S76.

In other words, because the time Tt until departure is set to be longer as the friction coefficient μ between the road surface and the tires becomes lower, the gain Ks is calculated to be smaller as the friction coefficient μ becomes lower, and the yaw moment given to the host vehicle is calculated to be smaller.

However, when the determination result of step S71 is $F_{out}=0$, the processing moves to step S74, where the output of the alarm signal AL is stopped.

Next, the processing moves to step S75, where the target yaw moment Ms is set to zero on the basis of Equation (32) below, and the processing moves to step S76.

$$Ms = 0 \qquad (32)$$

In step S76, target brake hydraulic pressure calculation processing that calculates the target brake hydraulic pressure $Ps_i$ (i=FL to RR) of each wheel in accordance with the target yaw moment Ms and the master cylinder hydraulic pressure Pm is conducted.

Next, the processing moves to step S77, where the target brake hydraulic pressures $Ps_{FL}$ to $Ps_{RR}$ calculated in step S76 are outputted to the brake hydraulic pressure control unit 7, the timer interruption processing ends, and the processing returns to a predetermined main program.

Figure 15:
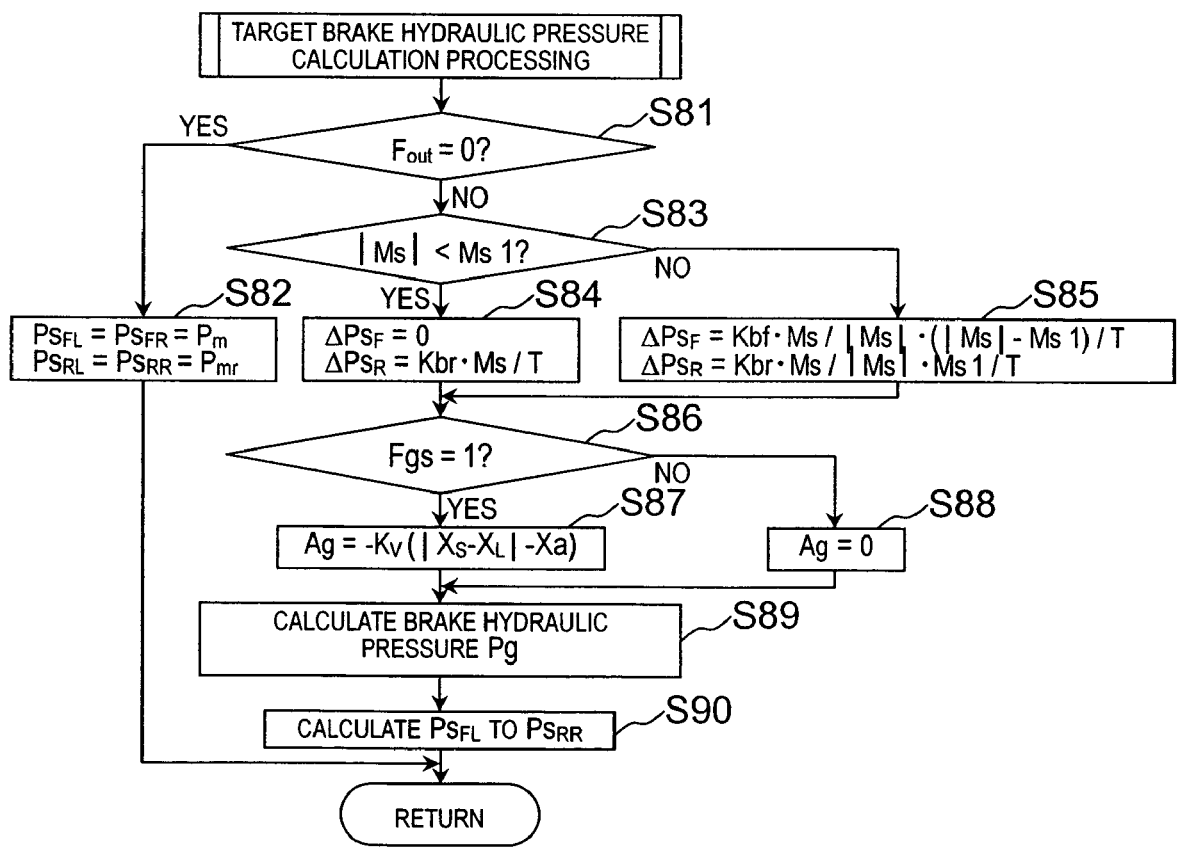
FIG. 15 is a flowchart showing a target brake hydraulic pressure calculation processing executed by the driving/braking force control unit in the lane departure prevention control processing of FIG. 10 in accordance with the second embodiment of the present invention.

In step S76, the target brake hydraulic pressure calculation processing shown in FIG. 15 is conducted. First, in step S81, the controller 8 determines whether or not the lane departure determination flag $F_{out}$ is reset to "0".

When the determination result of step S81 is $F_{out}=0$, the processing moves to step S82 where the target brake hydraulic pressure $Ps_{FL}$ of the front left wheel, the target brake hydraulic pressure $Ps_{FR}$ of the front right wheel, the target brake hydraulic pressure $Ps_{RL}$ of the rear left wheel and the target brake hydraulic pressure $Ps_{RR}$ of the rear right wheel are set using Equations (33) and (34) as follows:

$$Ps_{FL} = Ps_{FR} = Pmf/2 \qquad (33)$$

$$Ps_{RL} = Ps_{RR} = Pmr/2 \qquad (34)$$

When using Equation (33), the target brake hydraulic pressure $Ps_{FL}$ of the front left wheel and the target brake hydraulic pressure $Ps_{FR}$ of the front right wheel are set to ½ of the front wheel master cylinder pressure Pmf considering the longitudinal distribution from the master cylinder pressure Pm. Also when using Equation (34), the target brake hydraulic pressure $Ps_{RL}$ of the rear left wheel and the target brake hydraulic pressure $Ps_{RR}$ of the rear right wheel are set to ½ of the rear wheel master cylinder pressure Pmr considering the longitudinal distribution from the master cylinder pressure Pm, the target brake hydraulic pressure calculation processing ends, and the processing returns to the predetermined main program.

When the determination result of step S81 is $F_{out}=1$, the processing moves to step S83, where the controller 8 determines whether or not the absolute value of the target yaw moment Ms is equal to or greater than a preset set value Ms1. When |Ms|<Ms1, the processing moves to step S84, where the target brake hydraulic pressure differences $\Delta Ps_F$ and $\Delta Ps_R$ are calculated on the basis of Equations (35) and (36) as follows:

$$\Delta Ps_F = 0 \qquad (35)$$

$$\Delta Ps_R = Kbr \cdot Ms/T \qquad (36)$$

In Equation (36), the term T is the same tread of the front and rear wheels. Also, the term Kbr is a conversion factor when the braking force is converted to the brake hydraulic pressure, and is determined by the brake specification.

Thus, the target brake hydraulic pressure differences are set so that a difference is generated only in the braking force of the rear left and right wheels, and the processing moves to a later-described step S86.

When the determination result of step S83 is that |Ms|≧Ms1 is occurring, the processing moves to step S85, where the target brake hydraulic pressure differences $\Delta Ps_F$ and $\Delta Ps_R$ are calculated so that a difference is generated in the braking force of each wheel by using Equations (37) and (38) as follows:

$$\Delta Ps_F = Kbf \cdot Ms/|Ms| \cdot (|Ms| - Ms1)/T \qquad (37)$$

$$\Delta Ps_R = Kbr \cdot Ms/|Ms| \cdot Ms1/T \qquad (38)$$

In Equations (37) and (38), the terms Kbf and Kbr are conversion factors when the braking forces are converted to the brake hydraulic pressure, and are determined by the brake specifications. In this case, the braking forces are controlled only with respect to the front wheels and set to $\Delta Ps_F = Kbf \cdot Ms/T$.

Next in step S86, the controller 8 determines whether or not the deceleration control actuation flag Fgs is set to "1" meaning deceleration control actuation. When Fgs=1, the processing moves to step S87, where the target deceleration amount Ag is calculated on the basis of Equation (39) below using the parameter Xa calculated in step S64, and the processing moves to step S89.

$$Ag = -Kv \times (|X_S| - |X_L| - Xa) \qquad (39)$$

Here, the term Kv is a proportionality constant determined from the vehicle specification.

When the determination result of step S86 is Fgs=0, the processing moves to step S88, where the target deceleration amount Ag is set to zero on the basis of Equation (40) below, and the processing moves to step S89.

$$Ag = 0 \qquad (40)$$

In step S89, the target brake hydraulic pressure Pg for generating a braking force in both the left and right wheels is calculated on the basis of Equation (41) below with the aim of decelerating the host vehicle, and the processing moves to step S90.

$$Pg = Kg \times Ag \qquad (41)$$

Here, the term Kg is a proportionality constant determined from the vehicle specification. The target brake hydraulic pressure Pg calculated in this manner becomes the deceleration amount of a necessary minimum for suppressing the feeling of discomfort in the passengers stemming from the yaw moment given to the host vehicle at the time of departure avoidance control.

In step S90, the lane departure direction of the host vehicle is determined. When the host vehicle is departing rightward, the target brake hydraulic pressure $Ps_j$ of each wheel is calculated on the basis of Equation (42) below, and when the host vehicle is departing leftward, the target brake hydraulic pressure $Ps_j$ of each wheel is calculated on the basis of Equation (43) below, the target brake hydraulic pressure calculation processing ends, and the processing returns to the predetermined main program.

$$Ps_{FL}=Pmf/2+\Delta Ps_F/2+Pg/4,$$

$$Ps_{FR}=Pmf/2-\Delta Ps_F/2+Pg/4,$$

$$Ps_{RL}=Pmr/2+\Delta Ps_R/2+Pg/4,$$

$$Ps_{RR}=Pmr/2-\Delta Ps_R/2+Pg/4 \quad (42)$$

$$Ps_{FL}=Pmf/2-\Delta Ps_F/2+Pg/4,$$

$$Ps_{FR}=Pmf/2+\Delta Ps_F/2+Pg/4,$$

$$Ps_{RL}=Pmr/2-\Delta Ps_R/2+Pg/4,$$

$$Ps_{RR}=Pmr/2+\Delta Ps_R/2+Pg/4 \quad (43)$$

In the lane departure prevention control processing of FIG. 9, the processing of step S54 corresponds to a lane departure determination time calculating section. The processing of steps S55 to S59 corresponds to a lane departure determining section. The processing of steps S73, S75 and S83 to S85 of FIG. 15 corresponds to a yaw control amount calculating section. The processing of steps S86 to S89 corresponds to a braking control amount calculating section.

Thus, now, it will be assumed that the host vehicle is driving straight on a high μ road along the driving lane. In this case, because the lane departure estimation value $X_S$ where $|X_S|<|X_L|$ is calculated in step S55 in the lane departure prevention control processing of FIG. 9, the processing moves from step S57 to step S58, where the lane departure determination flag $F_{out}=0$, the condition is one indicating that the host vehicle is not in a lane departure tendency, the processing moves to step S24 due to the determination of step S71 of FIG. 10, the alarm is stopped, and the target yaw moment Ms is set to "0" in step S75. Thus, the master cylinder pressures Pmf and Pmr according to the brake operation of the driver are respectively set for the target brake pressures $Ps_{FL}$ to $Ps_{RR}$ of the wheels 5FL to 5RR in step S82 of FIG. 15, and the driving condition according to the steering operation of the driver is continued.

It will be assumed that, from this state, the host vehicle gradually begins to depart in the left direction from the center position of the driving lane due to inattentive driving by the driver. In this case, because the friction coefficient μ is estimated to be higher than the predetermined value $μ_{SET}$, the lane departure determination time is set in step S54 to the time $Tt_{SET}$, which is a lower limit. When the lane departure estimation value $X_S$ is calculated to be equal to or greater than the lane departure boundary line $X_L$ in step S55, the processing moves from step S57 to step S59, where the lane departure determination flag $F_{out}=1$ and the condition becomes one indicating that the host vehicle is in a lane departure tendency, the processing moves to step S72, the alarm is activated, and the target yaw moment Ms is calculated in step S73 on the basis of Equation (31).

Here, because the road surface friction coefficient μ is a high value, the gain Ks is set to a large value, and the target yaw moment Ms is calculated to be large in comparison to a case where the host vehicle is running on a low μ road. Then, the target brake hydraulic pressure Pg according to the running condition is calculated in step S89 of FIG. 8, and the target brake pressures $Ps_{FL}$ to $Ps_{RR}$ of the wheels 5FL to 5RR are set on the basis of Equation (42), whereby course correction in the right direction, which is the lane departure avoidance direction, can be precisely conducted by the deceleration control, which generates the braking force corresponding to the target brake hydraulic pressure Pg calculated in accordance with the running condition, and the yaw control, which provides the yaw moment to the host vehicle in consideration of the road surface friction coefficient μ.

In this manner, when the host vehicle is in a tendency to depart from the driving lane, the yaw control and the deceleration control are combined to conduct departure prevention control, so that a braking force difference is generated in each wheel to provide the yaw moment to the host vehicle by the yaw control, whereby course correction in the lane departure avoidance direction can be precisely conducted, and the feeling of discomfort in the passengers stemming from the yaw moment provided to the host vehicle can be reduced due to the braking force according to the running condition of the vehicle being generated by the deceleration control.

It will be assumed that the host vehicle is in a tendency to depart in the left direction from the center position of the driving lane while running on a low μ road. In this case, because the friction coefficient μ is estimated to be equal to or lower than the predetermined value $μ_{SET}$, the lane departure determination time Tt is set in step S54 to be larger than the time $Tt_{SET}$.

In this manner, because the lane departure determination time Tt is calculated to be large when the host vehicle is running on a low friction coefficient road, the lane departure estimation value $X_S$ is calculated to be large in comparison to the case where the host vehicle is running on a high friction coefficient road, even with the same lateral displacement X. Thus, in the determination of the lane departure estimation value $X_S$ in step S57, the timing at which the lane departure estimation value $X_S$ is determined to be equal to or greater than the lane departure boundary line $X_L$ can be quickened, and the timing at which braking control for avoiding departure is initiated can be quickened, whereby safer departure avoidance control can be conducted.

Then, when the lane departure estimation value $X_S$ that is equal to or greater than the lane departure boundary line $X_L$ is calculated in step S55, the processing moves from step S57 to step S59, the lane departure determination flag $F_{out}=1$, the condition becomes one indicating that the host vehicle is in a lane departure tendency, the processing moves to step S72 due to the determination of step S71, the alarm is activated, and the target yaw moment Ms is calculated on the basis of Equation (5) in step S73.

Here, because the road surface friction coefficient μ is a low value, the gain Ks is set to a small value, and the target yaw moment Ms is calculated to be small in comparison to a case where the host vehicle is running on a high μ road. Then, the target brake hydraulic pressure Pg according to the running condition is calculated in step S89 of FIG. 15, and the target brake pressures $Ps_{FL}$ to $Ps_{RR}$ of the wheels 5FL to 5RR are set on the basis of Equation (42), whereby course correction in the right direction, which is the lane departure avoidance direction, can be precisely conducted by the deceleration control, which generates the braking force corresponding to the target brake hydraulic pressure Pg calculated in accordance with the running condition, and the yaw control, which provides the yaw moment to the host vehicle in consideration of the road surface friction coefficient µ

Thus, when the host vehicle is running on a low friction coefficient road, the gain Ks for calculating the target yaw moment Ms is calculated to a small value, and the target yaw moment Ms is calculated to be small in comparison to the case where the host vehicle is running on a high friction coefficient road, so that the yaw moment generated in the host vehicle for departure avoidance can be made smaller, i.e., so that the brake hydraulic pressures generated in each wheel can be lowered. Thus, because the road surface friction coefficient is low, the feeling of discomfort can be prevented from being given to the passengers by the yaw control.

In this manner, when the host vehicle is in a tendency to depart from the driving lane, the yaw control and the deceleration control are combined to conduct departure prevention control, so that brake hydraulic pressures in the yaw control and the deceleration control are calculated in consideration of the friction coefficient of the host vehicle driving road, whereby appropriate departure avoidance control according to the road surface friction coefficient can be conducted.

Also, the estimated lateral displacement after the predetermined time, i.e., the lane departure estimation value is calculated on the basis of the lateral displacement of the host vehicle, the lane departure determination is conducted on the basis of this departure estimation value, and the predetermined time is set to be large as the road surface friction coefficient becomes lower. Thus, the timing at which the deceleration control for avoiding departure is initiated can be quickened, and departure from the driving lane can be avoided without giving the passengers a feeling of discomfort.

Moreover, because the gain for calculating the yaw moment generated in the host vehicle in order to avoid departure is calculated to be small the lower the road surface friction coefficient becomes, the braking force generated in each wheel can be set to be small, a feeling of discomfort can be prevented from being given to the passengers because the host vehicle runs on a low friction coefficient road, and appropriate departure avoidance control can be conducted.

Also, because the friction coefficient between the road surface and the tires is estimated by ABS and the estimated friction coefficient is stored in the storage device, the estimation time of the road surface friction coefficient can be reduced, and the braking control for avoiding departure can be rapidly conducted.

In the above-described embodiment, a case was described where the friction coefficient between the road surface and the tires was estimated by ABS at the time of the brake operation by the driver, but the invention is not limited thereto. The friction coefficient between the road surface and the tires can also be estimated by VDC.

Also, in the above-described embodiment, the road surface friction coefficient may also be estimated by a navigation system. In this case, road information (common roadway/expressway) is determined by the navigation system, deceleration is conducted by signals and corners when the vehicle is running on a common roadway and is conducted when the vehicle enters a tollbooth when the vehicle is running on an expressway. Thus, in this case, the friction coefficient is estimated and the estimated friction coefficient is stored in the storage device.

Moreover, in the above-described embodiment, the invention may also be configured so that a signal from the wiper switch is received and the road surface friction coefficient is estimated in accordance with the wiper speed. In this case, the wiper speed during wiper operation is detected, the friction coefficient µ is set to a predetermined low friction coefficient value $\mu_L$ when the wiper speed is fast, and the friction coefficient µ is set to a predetermined high friction coefficient value $\mu_H$ when the wiper speed is slow. Here, $\mu_H > \mu_L$.

Also, in the above-described embodiment, a case was described where alarm notification was conducted when the driver was not changing lanes and the host vehicle was in a lane departure tendency, but the invention is not limited thereto. A shift may be generated in the timing at which the alarm notification is conducted and the timing at which braking control (yaw control and deceleration control) is conducted. Because G is applied to the driver by using the braking control, the braking control itself can include the alarm effect.

Moreover, in the above-described embodiment, a case was described where the invention was applied to a rear wheel drive vehicle, but the invention can also be applied to a front wheel drive vehicle. In this case, of the wheel velocities $Vw_{FL}$ to $Vw_{RR}$, the velocity V of the host vehicle can be calculated in step S53 from the average value of the velocities $Vw_{RL}$ and $Vw_{RR}$ of the rear left and right wheels, which are the non-driven wheels.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-372852 and 2003-419053. The entire disclosure of Japanese Patent Application Nos. 2003-372852 and 2003-419053 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lane departure prevention apparatus comprising:
 a running condition detecting section configured to detect at least one driving road condition of a host vehicle;

a yaw control amount calculating section configured to calculate a first braking force control amount based on the driving road condition detected by the running condition detecting section such that a yaw moment is generated in a direction avoiding lane departure of the host vehicle from a driving lane;

a braking control amount calculating section configured to calculate a second braking force control amount based on the driving road condition detected by the running condition detecting section such that the host vehicle decelerates; and a braking force control section configured to control a total braking force control amount in accordance with the first and second braking force control amounts calculated by the yaw control amount calculating section and the braking control amount calculating section.

2. The lane departure prevention apparatus according to claim 1, wherein the running condition detecting section is further configured to detect affects resulting from a disturbance on the host vehicle as the driving road condition, and the braking control amount calculating section is further configured to calculate the second braking force control amount based on the driving road condition detected by the running condition detecting section.

3. The lane departure prevention apparatus according to claim 2, wherein the running condition detecting section is further configured to determine that the host vehicle will continue to receive the disturbance affects for a predetermined time after detecting the disturbance based on the driving road condition detected by the running condition detecting section.

4. The lane departure prevention apparatus according to claim 2, wherein the running condition detecting section is further configured to detect an unevenness of the driving lane as the disturbance on the host vehicle based on a wheel stroke amount.

5. The lane departure prevention apparatus according to claim 2, wherein the running condition detecting section is further configured to detect a wheel slip ratio of the host vehicle and determine the disturbance on the host vehicle based on determining a low friction coefficient road of the driving lane from the wheel slip ratio.

6. The lane departure prevention apparatus according to claim 2, wherein the braking control amount calculating section is further configured to calculate the second brake driving force control amount so that the total braking force is larger in the host vehicle when the disturbance is detected by the running condition detecting section in comparison to a non-disturbance condition.

7. The lane departure prevention apparatus according to claim 2, wherein the braking control amount calculating section is further configured to calculate the second brake driving force control amount so that the total braking force is larger in the host vehicle when the disturbance detected by the running condition detecting section affects both a front wheel and a rear wheel in comparison to a case where the disturbance is detected to only affect one of the front wheel and the rear wheel.

8. The lane departure prevention apparatus according to claim 2, wherein the yaw control amount calculating section is further configured to calculate the first brake driving force control amount to conduct yaw control of non-disturbance-affected wheels in accordance with the disturbance affects of each disturbance-affected wheel detected by the running condition detecting section.

9. The lane departure prevention apparatus according to claim 2, wherein the running condition detecting section is further configured to detect a host vehicle angle formed relative to the driving lane and a longitudinal direction axis of the host vehicle, a lateral displacement of the host vehicle with respect to the driving lane, and a driving lane curvature of the driving lane; and the yaw control amount calculating section is further configured to calculate the first brake driving force control amount to generate a target yaw moment based on at least one of the host vehicle angle, the lateral displacement and the driving lane curvature detected by the running condition detecting section.

10. The lane departure prevention apparatus according to claim 9, further comprising a lane change determining section configured to determine a lane change intent of the driver, and the yaw control amount calculating section being further configured to calculate the target yaw moment to return the host vehicle to a host vehicle orientation prior to the disturbance when the lane change determining section determines that the lane change intent existed before and during the disturbance.

11. The lane departure prevention apparatus according to claim 1, wherein the running condition detecting section is further configured to estimate a road surface friction coefficient of the driving lane as the driving road condition; and the yaw control amount calculating section is further configured to adjust the first braking force control amount based on the road surface friction coefficient estimated by the running condition detecting section.

12. The lane departure prevention apparatus according to claim 11, wherein the running condition detecting section is further configured to detect a lateral displacement of the host vehicle with respect to the driving lane, and further comprising a lane departure determining section configured to estimate a lateral displacement estimation value based on the lateral displacement of the host vehicle with respect to the driving lane after a predetermined time and to conduct a lane departure determination based on the lateral displacement estimation value; and a lane departure determination time calculating section configured to set the predetermined time in accordance with the road surface friction coefficient estimated by the friction coefficient estimating section.

13. The lane departure prevention apparatus according to claim 12, wherein the lane departure determination time calculating section is further configured to set the predetermined time to a larger value as the road surface friction coefficient estimated by the friction coefficient estimating section becomes lower.

14. The lane departure prevention apparatus according to claim 11, wherein the yaw control amount calculating section is further configured to calculate the first braking force control amount to be a smaller value as the road surface friction coefficient estimated by the friction coefficient estimating section becomes lower.

15. The lane departure prevention apparatus according to claim 11, wherein
the running condition detecting section is further configured to estimate the road surface friction coefficient using an anti-skid control.

16. The lane departure prevention apparatus according to claim 11, wherein
the running condition detecting section is further configured to estimate the road surface friction coefficient using a vehicle dynamics control.

17. The lane departure prevention apparatus according to claim 11, wherein
the running condition detecting section is further configured to estimate the road surface friction coefficient using a navigation system.

18. The lane departure prevention apparatus according to claim 11, wherein
the running condition detecting section is further configured to estimate the road surface friction coefficient using a wiper wiping speed.

19. A lane departure prevention apparatus comprising:
running condition detecting means for detecting at least one driving road of a host vehicle;
a yaw control amount calculating means for calculating a first braking force control amount based on the driving road condition detected by the running condition detecting means such that a yaw moment is generated in a direction avoiding lane departure of the host vehicle from a driving lane;
a braking control amount calculating means for calculating a second braking force control amount based on the driving road detected by the running condition detecting means such that the host vehicle decelerates; and
a braking force control means for controlling a total braking force control amount in accordance with the first and second braking force control amounts calculated by the yaw control amount calculating means and the braking control amount calculating means.

20. A method of avoiding lane departure of a host vehicle comprising:
detecting at least one driving road condition of a host vehicle;
calculating a first braking force control amount based on the driving road condition that was detected such that a yaw moment is generated in a direction avoiding lane departure of the host vehicle from a driving lane;
calculating a second braking force control amount based on the driving road running condition that was detected such that the host vehicle decelerates; and
controlling a total braking force control amount in accordance with the first and second braking force control amounts that were calculated.

* * * * *